United States Patent
Kismarton

(10) Patent No.: US 11,794,421 B2
(45) Date of Patent: Oct. 24, 2023

(54) CARTRIDGE MOLDING OF WING PANELS FOR AIRCRAFT

(71) Applicant: The Boeing Company, Chicago, IL (US)

(72) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 17/536,254

(22) Filed: Nov. 29, 2021

(65) Prior Publication Data
US 2022/0194025 A1 Jun. 23, 2022

Related U.S. Application Data

(60) Provisional application No. 63/127,657, filed on Dec. 18, 2020.

(51) Int. Cl.
*B29C 70/34* (2006.01)
*B29C 70/54* (2006.01)
*B29L 31/30* (2006.01)

(52) U.S. Cl.
CPC .......... *B29C 70/345* (2013.01); *B29C 70/342* (2013.01); *B29C 70/54* (2013.01); *B29L 2031/3085* (2013.01)

(58) Field of Classification Search
CPC .................................. B29C 70/345; B64F 5/10
See application file for complete search history.

(56) References Cited

U.S. PATENT DOCUMENTS

| 5,728,309 A | 3/1998 | Matsen et al. |
| 2010/0196637 A1* | 8/2010 | Lippert ................. F16C 7/026 428/36.1 |
| 2017/0232642 A1 | 8/2017 | Fiegl et al. |

FOREIGN PATENT DOCUMENTS

WO 2008020158 A2 2/2008
WO 2014200393 A1 12/2014

OTHER PUBLICATIONS

GB Examination Report; Application GB2113882.1; dated Jan. 11, 2023.
Litz Wire; Wikipedia; May 19, 2020.
Sara Black; SQRTM enables net-shape parts; https://www.compositesworld.com/articles/sqrtm; May 19, 2020.
Examination Report; Application GB2113882.1; dated Mar. 22, 2022.
Examination Report; Application GB2113882.1; dated Apr. 4, 2023.

* cited by examiner

Primary Examiner — Scott W Dodds
(74) Attorney, Agent, or Firm — Duft & Bornsen, PC

(57) ABSTRACT

Systems and methods are provided for hardening wing panel preforms. One embodiment is a method for fabricating a wing panel for an aircraft. The method includes loading a wing skin preform onto a contour of an Outer Mold Line (OML) tool, applying stringer preforms to troughs of an Inner Mold Line (IML) tool, aligning the OML tool with the IML tool, and assembling the IML, tool and the OML tool into a cartridge that molds a wing panel preform comprising the wing skin preform and the stringer preforms. The method further includes inserting the cartridge into a press, and hardening the wing panel preform into a composite part while the cartridge resides in the press.

20 Claims, 21 Drawing Sheets

CARTRIDGE MOLDING OF WING PANELS FOR AIRCRAFT

RELATED APPLICATIONS

This non-provisional patent application claims priority to U.S. Provisional Patent Application No. 63/127,657, filed on Dec. 18, 2020.

FIELD

The disclosure relates to the field of fabrication, and in particular, to fabrication of composite parts for aircraft.

BACKGROUND

Composite wing panels for aircraft are presently fabricated via vacuum bagging. During vacuum bagging, caul plates are placed over stringer preforms of a wing panel preform, the vacuum bag itself is sealed into place over the wing panel preform and leak checked, and the preform is hardened into a composite part. While vacuum bagging accommodates large composite parts, there are issues pertaining to compliance of resulting composite parts with desired contours. That is, vacuum bagging can result in markup, bow waves, resin pooling, and other issues that cause the composite part to deviate from desired contours. To address these deviations, a composite wing panel may need to be shimmed and/or machined in order to meet desired tolerances, which is a time consuming and expensive process.

Therefore, it would be desirable to have a method and apparatus that take into account at least some of the issues discussed above, as well as other possible issues.

SUMMARY

Embodiments described herein provide for cartridge-based molding of wing panels, wherein a rigid Inner Mold Line (IML) tool and a corresponding Outer Mold Line (OML) tool together form a single cartridge. To accomplish cartridge-based molding, an individual wing panel preform is laid up at a cartridge and held in shape by the tools of the cartridge. Individual cartridges each receive a preform, are inserted into a press, are heated to harden the preform into a composite part, are removed, and have their composite part demolded. This process, which utilizes removable cartridges for the press, enables demolding and layup processes to be performed at the cartridges themselves, instead of at the press. Thus, the press can continue to operate to harden another composite part while a first composite part is being laid up or demolded. This increases overall uptime of the press. Furthermore, because the cartridges used by the press include rigid tooling on both the IML side and OML side of a composite part, the resulting composite part has less need of time-consuming rework.

One embodiment is a method for fabricating a wing panel for an aircraft. The method includes loading a wing skin preform onto a contour of an Outer Mold Line (OML) tool, applying stringer preforms to troughs of an Inner Mold Line (IML) tool, aligning the OML tool with the IML tool, and assembling the IML tool and the OML tool into a cartridge that molds a wing panel preform comprising the wing skin preform and the stringer preforms. The method further includes inserting the cartridge into a press, and hardening the wing panel preform into a composite part while the cartridge resides in the press.

A further embodiment is a system for fabricating a wing panel. The system includes a plurality of cartridges that each comprise an Outer Mold Line (OML) tool and an Inner Mold Line (IML) tool for a wing panel preform, and a press that is dimensioned to receive a cartridge. The press includes strong backs that sandwich the cartridge, a platen that applies pressure to the cartridge while the cartridge is sandwiched by the strong backs, and a heater that heats the cartridge while the platen applies pressure.

A further embodiment is a method for hardening wing panels. The method includes opening a press, inserting a cartridge that includes a wing panel preform into the press, hardening the wing panel preform into a composite part while the cartridge resides in the press via the application of heat and pressure, removing the cartridge from the press, inserting another cartridge that includes another wing panel preform into the press, and demolding the composite part from the cartridge while the other wing panel preform within the other cartridge is being hardened into a composite part at the press.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
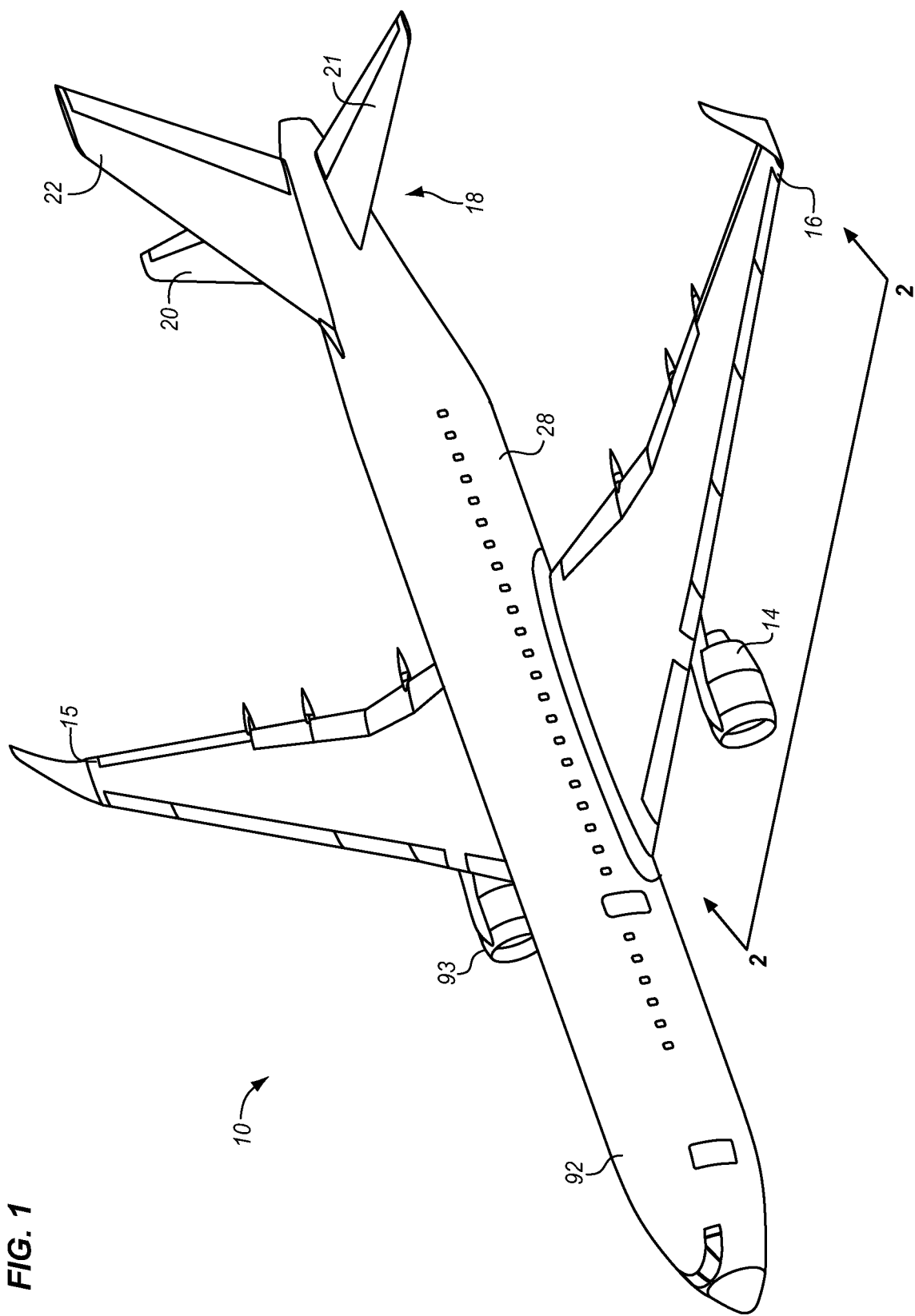
FIG. 1 illustrates an aircraft in an illustrative embodiment.

Turning now to FIG. 1, an illustration of an aircraft 10 is depicted for which the fabrication systems and methods described herein may be implemented. In this illustrative example, aircraft 10 includes wing 15 and wing 16 attached to body 28 having a nose 92. Aircraft 10 includes engine 93 attached to wing 15 and engine 14 attached to wing 16. Tail section 18 is also attached to body 28. Horizontal stabilizer 20, horizontal stabilizer 21, and vertical stabilizer 22 are attached to tail section 18 of body 28.

Figure 2:
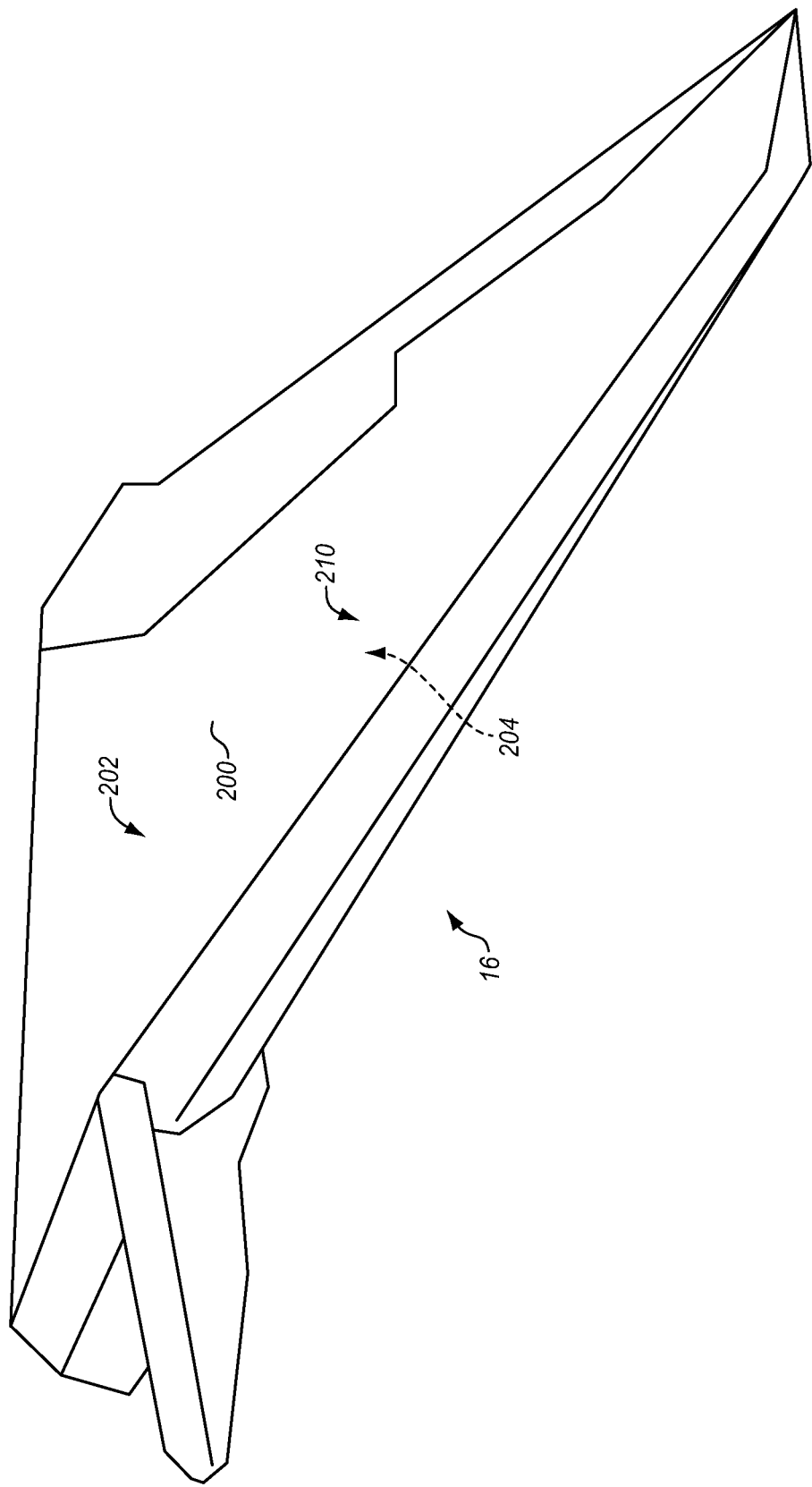
FIG. 2 illustrates a wing of an aircraft in an illustrative embodiment.

FIG. 2 illustrates a wing 16 of an aircraft 10 in an illustrative embodiment, and corresponds with view arrows 2 of FIG. 1. In this embodiment, wing 16 includes a wing panel 200 made of a fiber reinforced material 210, such as CFRP. The wing panel includes an Outer Mold line 202 that receives airflow, and an Inner Mold Line (IML) 204 that is internal to the wing 16 and is hidden from view. An OML defines an outward-facing portion of a composite part when fully assembled. For example, an OML of a wing panel for an aircraft may define a top or bottom surface of a wing. An IML defines an inward-facing portion of a composite part when fully assembled. For example, an IML of a wing panel for an aircraft may define a surface of an internal fuel tank within a wing.

Figure 3:
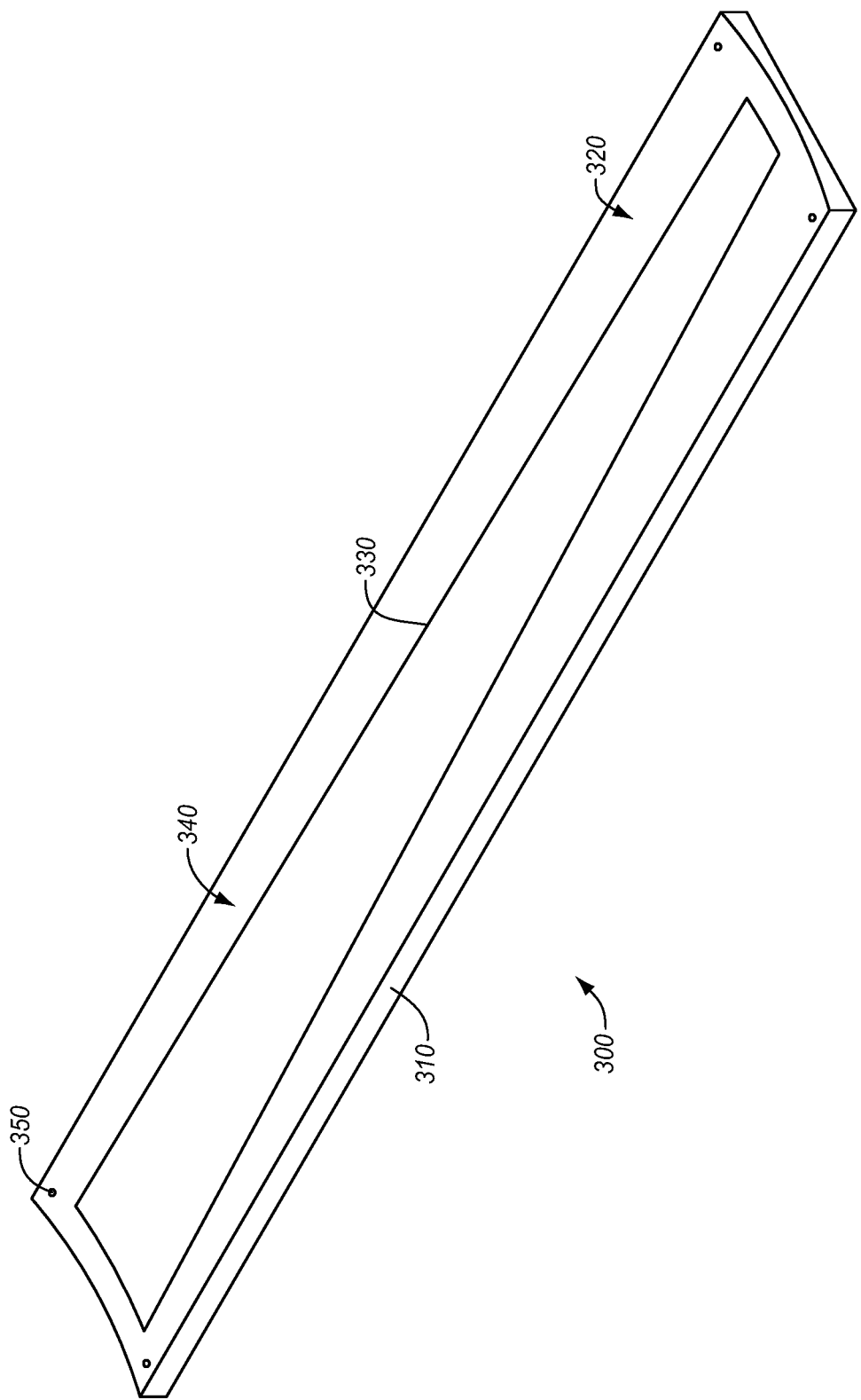
FIG. 3 illustrates a wing skin preform laid-up at an OML tool in an illustrative embodiment.

FIGS. 3-14 depict various techniques for fabricating composite parts, such as wing panel 200, via cartridge molding processes. Specifically, FIG. 3 illustrates an OML tool 300 for laying up a wing skin preform 330 in an illustrative embodiment. The wing skin preform 330 is laid-up at a contour 320 defined by a body 310 of the OML tool 300. The contour 320 corresponds with a desired OML of a wing panel. In this embodiment, the OML tool 300 has been precisely machined (e.g., to within five thousandths of an inch along contour 320) such that OML tool 300 imparts a precisely determined shape onto the wing skin preform 330. With this amount of precision, a resulting wing panel 200 that has been fabricated using the OML tool 300 may not need to be shimmed, because the wing panel 200 may already be tightly toleranced to the point where shimming may not be necessary. In this embodiment, OML tool 300 further comprises indexing features 350, such as cups that are complementary to cones at an Inner Mold Line (IML) tool, such as IML, tool 400 below.

The OML tool 300 is made from a suitably rigid material with a low Coefficient of Thermal Expansion (CTE). For example, the OML tool 300 may be made from a nickel-iron alloy 340, such as invar. The OML tool 300 may be fabricated via welding, casting, and/or Numerically Controlled (NC) machining to reach a desired shape at a desired tolerance (e.g., five thousandths of an inch). An OML tool 300 for a wing panel 200 may have a length of sixty feet or more, and may weigh thirty to forty tons or more.

Figure 4:
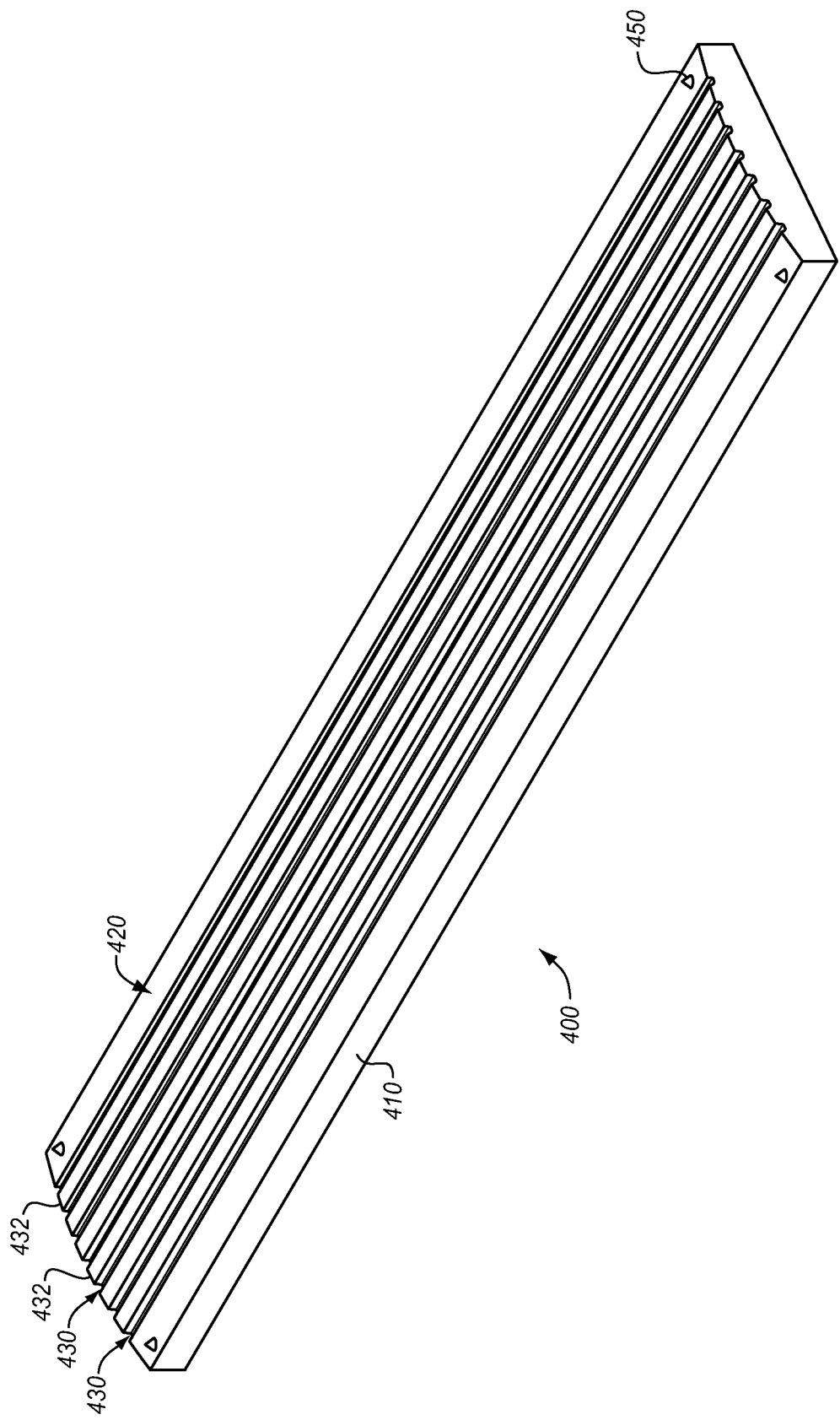
FIG. 4 illustrates an IML tool in an illustrative embodiment.

FIG. 4 illustrates an IML tool 400 in an illustrative embodiment. A body 410 of the IML tool 400 includes a surface 420 and ridges 432 that define troughs 430 into which stringer preforms of a wing panel 200 are placed and molded. The surface 420 defines an IML for the wing panel. Any suitable number of troughs 430 may be defined by the body 410 depending on the design of the wing panel 200. In this embodiment, the troughs 430 are dimensioned to receive and hold preforms for hat stringers, although in further embodiments the troughs 430 are dimensioned to support other shapes for stringers. In this embodiment, IML tool 400 further comprises indexing features 450, such as cones that are complementary to cups at an OML tool 300.

In this embodiment, the IML tool 400 has been precisely machined (e.g., to within five thousandths of an inch along the surface 420) such that IML tool 400 imparts a precisely determined shape onto the wing skin preform 330 as well as any stringer preforms attached thereto. With this amount of precision, a resulting wing panel 200 that has been fabricated using the IML tool 400 may not need to be shimmed, because the wing panel 200 may already be tightly toleranced to the point where shimming may not be necessary. An IML tool 400 for a wing panel 200 may have a length of sixty feet or more, and may weigh thirty to forty tons or more.

The IML tool 400 is made from a suitably rigid material with a low CTE. For example, the IML, tool 400 may be made from a nickel-iron alloy, such as invar. The IML tool 400 may be fabricated via welding, casting, and/or NC machining to reach a desired shape at a desired tolerance (e.g., five thousandths of an inch).

Figure 5:
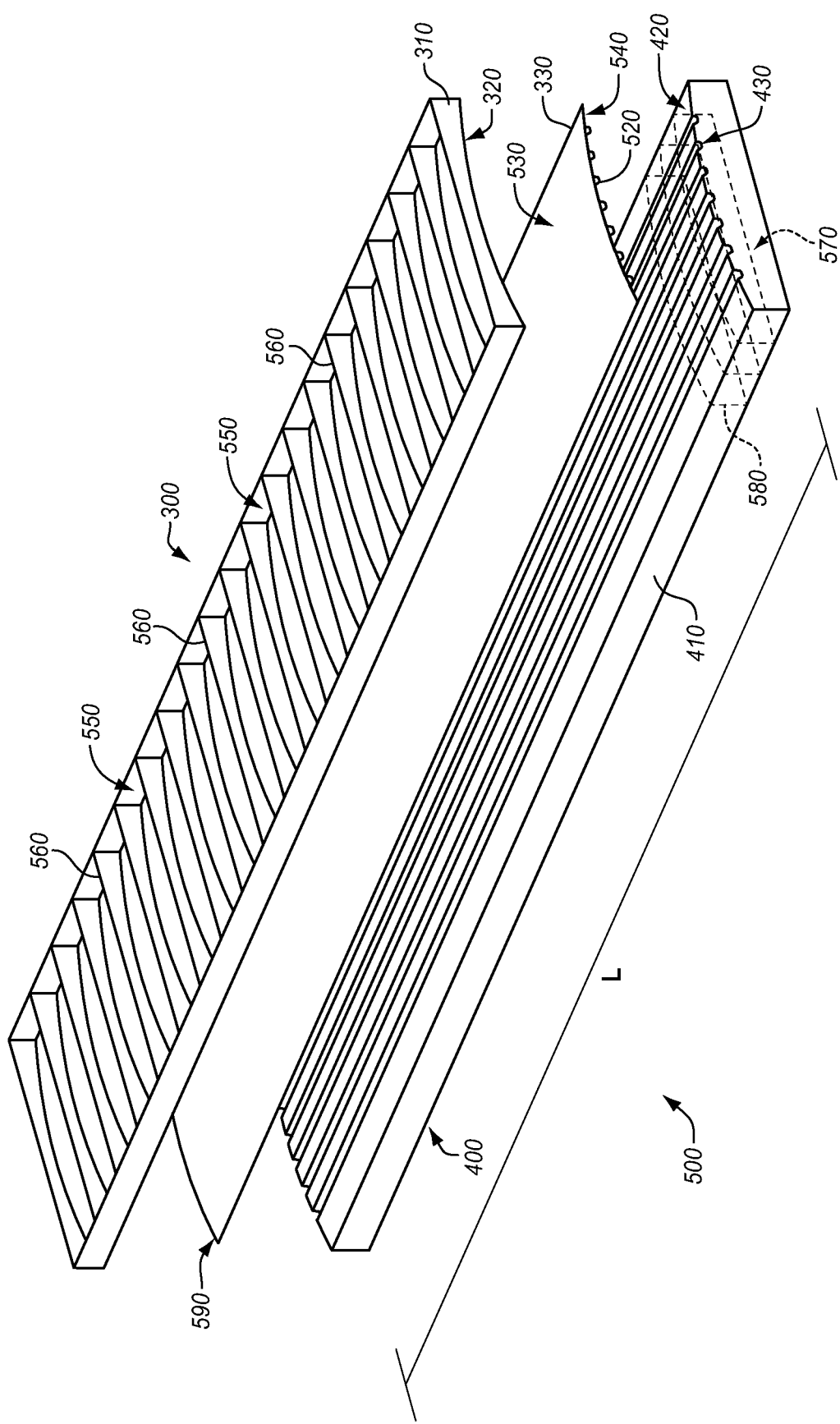
FIG. 5 is an exploded view of a cartridge that includes a wing panel preform in an illustrative embodiment.

FIG. 5 is an exploded view of a cartridge 500 that includes a wing panel preform 590 in an illustrative embodiment. In this embodiment, the wing panel preform 590 includes a wing skin preform 330 and multiple stringer preforms 520. The wing panel preform 590 includes a surface 530 (e.g., defining an OML of the wing panel preform 590) that is conformed against contour 320 of the OML tool 300. The wing panel preform 590 also includes a surface 540 (e.g., defining an IML of the wing panel preform 590) that is conformed against surface 420 of the IML tool 400, such that stringer preforms 520 are placed within troughs 430 of the IML tool 400.

Cartridge 500 surrounds and defines a shape for the wing panel preform 590 while the wing panel preform 590 is being hardened. The cartridge 500 includes both the IML tool 400 and the OML tool 300, which surround the wing panel preform 590 in order to enforce a desired net shape while hardening continues. In this manner, the wing panel preform 590 is sandwiched between the OML tool 300 and the IML tool 400. The cartridge 500 is dimensioned for removable insertion into a press.

In this embodiment, body 310 of the OML tool 300 includes ribs 560 which define volumes 550 for receiving heaters at a press, and the body 410 of the IML tool 400 includes ribs 580 which define volumes 570 for receiving heaters at a press. Only a subset of ribs 580 have been illustrated for the sake of clarity. While in this embodiment the ribs 560 and the ribs 580 run perpendicular to the length L of the cartridge 500, in further embodiments the ribs 560 run at any suitable orientation, such as parallel to the length L. Furthermore, while volumes 550 and volumes 570 are accessible from the outside of the cartridge 500 in this embodiment, in further embodiments these volumes 550 and volumes 570 are partially or entirely enclosed within their respective tools. In still further embodiments, the volumes 550 and the volumes 570 are dimensioned for receiving steam from a press. While steam is described as the heating medium with regard to the present FIGS., any fluid may be utilized, including gases and/or liquids. For example, the fluid may comprise steam, oil, glycol, or others.

Because the cartridge 500 is "double-tooled" (i.e., has a rigid and precisely machined tool on either end), the cartridge 500 exhibits a technical benefit because it results in substantially fewer deviations from desired shape than vacuum bagging systems (e.g., as caused by markup, resin bow waves, resin pooling, flash edges, sealant removal, etc.). This is because a vacuum bag itself is not sufficiently rigid to perfectly enforce a desired shape onto a preform, especially a wing panel preform 590 which may be sixty feet long and may need to be toleranced to a high level of precision in order to avoid shimming. Even when vacuum bags enforce a desired shape to within thirty or forty thousandths of an inch, shimming may still be needed when assembling a wing panel together with spars and ribs for a wing.

Figure 6:
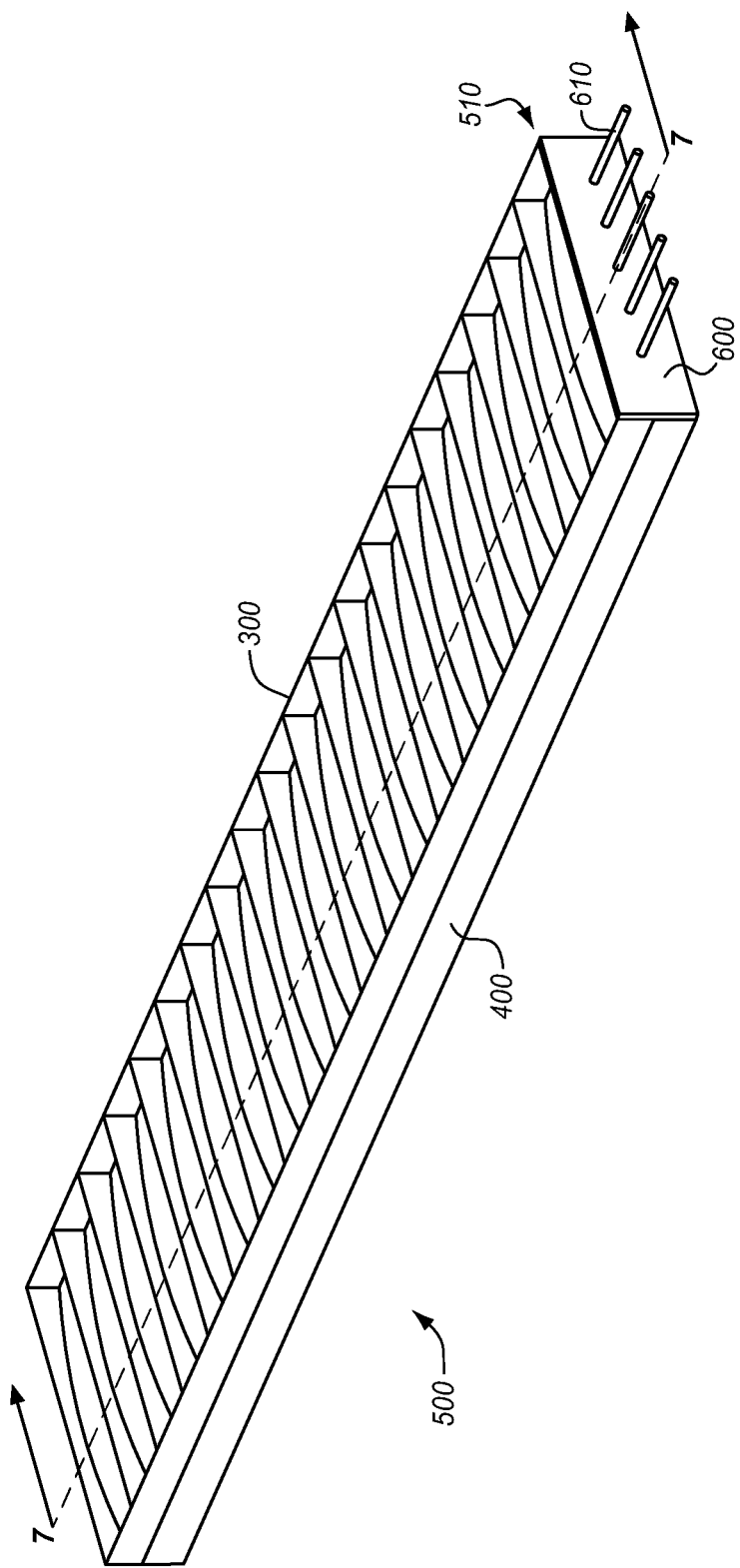
FIG. 6 is an unexploded view of the cartridge of FIG. 5 in an illustrative embodiment.

FIG. 6 is an unexploded view of the cartridge 500 of FIG. 5 in an illustrative embodiment. Thus, the IML tool 400 and the OML tool 300 surround the wing panel preform 590, which is no longer visible. An end plate 600 is attached to an end 510 of the cartridge in order to seal the end 510. The end plate 600 includes ports 610 for inflating bladders (e.g., bladders 710 of FIG. 7) within the stringer preforms 520 at the wing panel preform 590.

Figure 7:
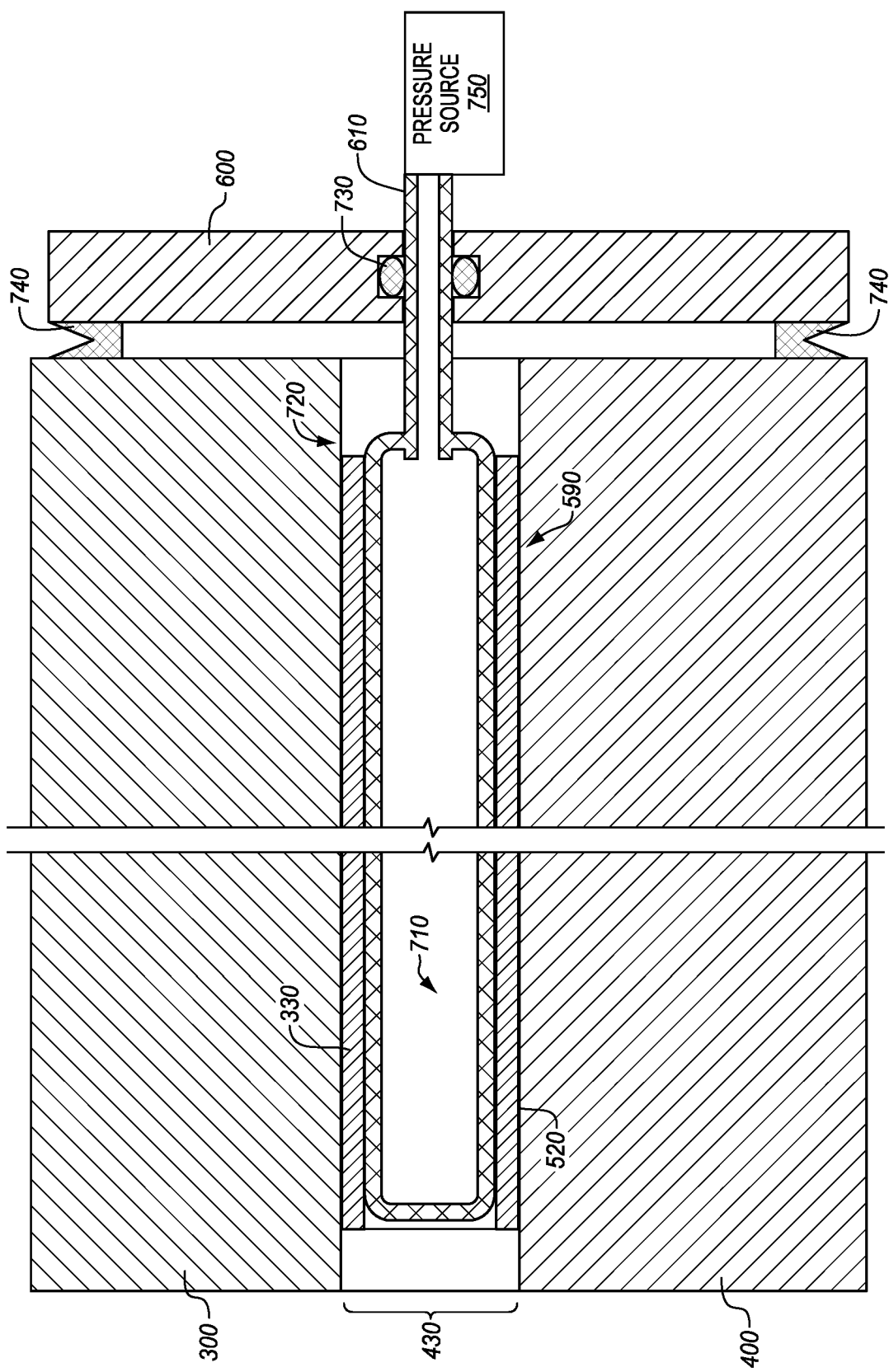
FIG. 7 is a section cut view of a cartridge in an illustrative embodiment.

FIG. 7 is a section cut view of a cartridge 500 in an illustrative embodiment, and corresponds with view arrows 7 of FIG. 6. FIG. 7 is not drawn to scale, in order to enhance the visibility of bladder 710 and other internal components. In FIG. 7, bladder 710 is disposed within a stringer preform 520 of a wing panel preform 590. The stringer preform 520 is itself nested within a trough 430 of the IML tool 400, and is disposed beneath an interface 720 between the OML tool 300 and the IML tool 400. The bladder 710 is coupled via port 610 to a pressure source 750 that is external to the cartridge 500 (e.g., a compressor, a reservoir of shop air, etc.). The port 610 is sealed to the end plate 600 via seals 730 (e.g., O-rings), and the end plate 600 is sealed to the cartridge 500 via seals 740 (e.g., a silicone or rubber seal that extends along a length of the cartridge 500). During hardening, the bladder 710 is pressurized by the pressure source 750 to ensure that the stringer preform 520 does not collapse and retains a desired shape.

Figure 8:
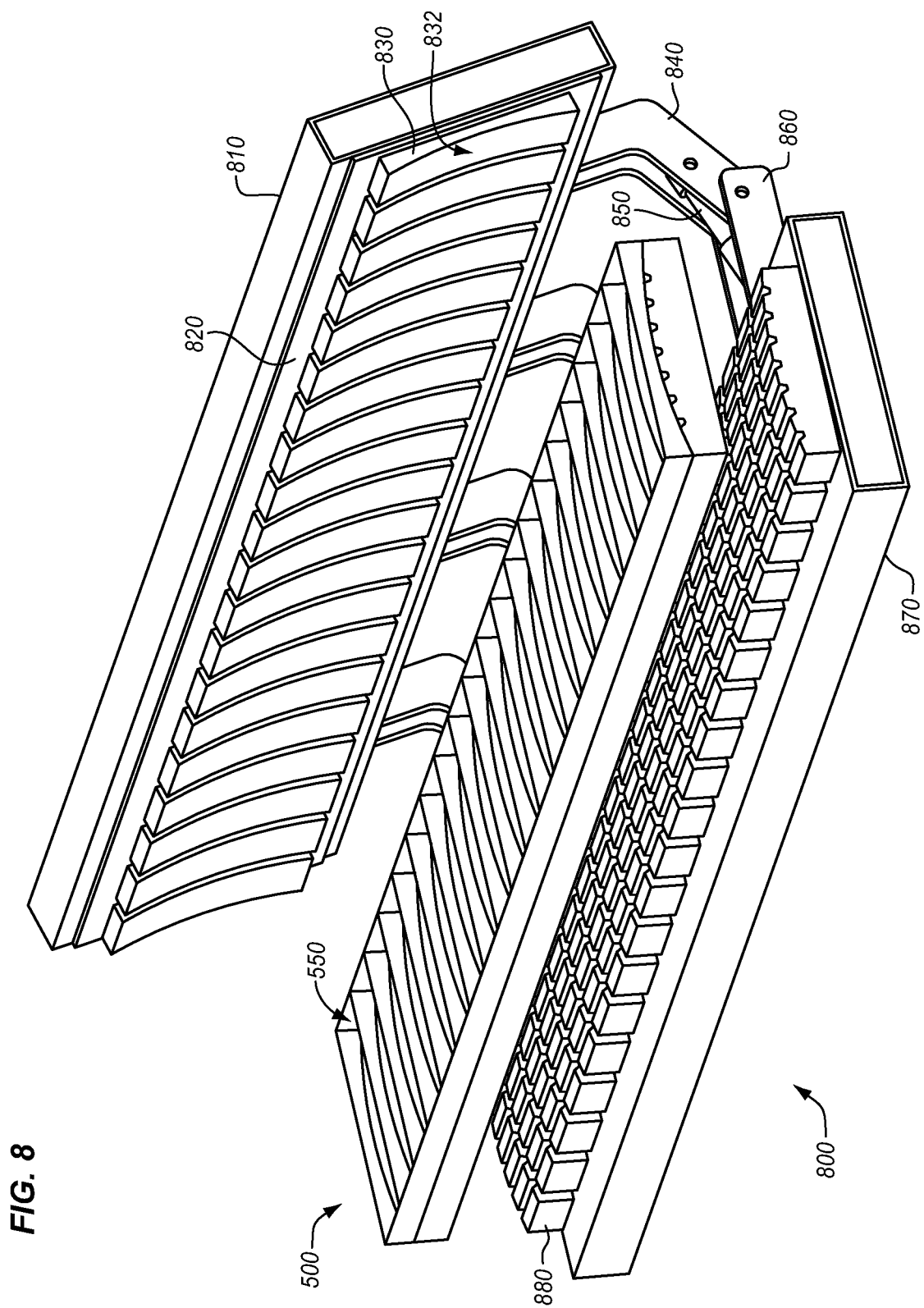
FIG. 8 depicts insertion of a cartridge into a press in an illustrative embodiment.

FIG. 8 depicts insertion of a cartridge 500 into a press 800 in an illustrative embodiment. The press 800 is dimensioned to receive cartridges 500, one at a time. In this embodiment, the press 800 includes strong backs 810 and 870, which are coupled together via linkage members 840 and linkage members 860. The strong back 810 and strong back 870 may be opened via the action of a hydraulic piston 850. While the strong back 810 and strong back 870 are open, a cartridge 500 is placed between them. Then, the strong back 810 and strong back 870 may be closed and locked into place. After the strong back 810 and strong back 870 are locked, a platen 820, which is attached to strong back 810, is driven into the cartridge 500 to apply pressure. That is, the platen 820 applies pressure to the cartridge 500 while the cartridge 500 is sandwiched by strong back 810 and strong back 870.

Heaters 830 extend from the platen 820, and are dimensioned for insertion into volumes 550 of the cartridge 500 when the cartridge 500 is placed into the press 800. Heaters 880 of the strong back 870 are dimensioned for insertion into volumes 570 of the cartridge 500. The heaters 830 and 880 heat a cartridge 500 while the platen 820 applies pressure. Furthermore, in this embodiment, the heaters 830 and 880 are nested within the cartridge 500 while the cartridge 500 resides at the press 800.

The heaters 830 and the heaters 880 may be implemented as radiant heating elements, resistive heating elements, smart susceptors discussed in U.S. Pat. No. 5,728,309, or other via other technologies. For example, the heaters 830 and the heaters 880 may be made from a susceptor material 832 (e.g., a metal alloy or metallic alloy) that is engineered to have a Curie temperature at or near a hardening temperature used by the press. In this manner, the susceptor material 832 heats in response to an applied electromagnetic field until reaching the Curie temperature, at which point the susceptor material 832 transforms to a nonmagnetic phase.

After the cartridge 500 has been heated to transform a wing panel preform 590 into a composite part, the hydraulic piston 850 is operated to open the press 800, and the cartridge 500 is removed.

The use of multiple interchangeable instances of cartridges at the press 800 provides a technical benefit in that it eliminates the need for substantial demolding, clean-up, or preparation to be performed at the press 800, which increases up-time for the press 800.

Figure 9:
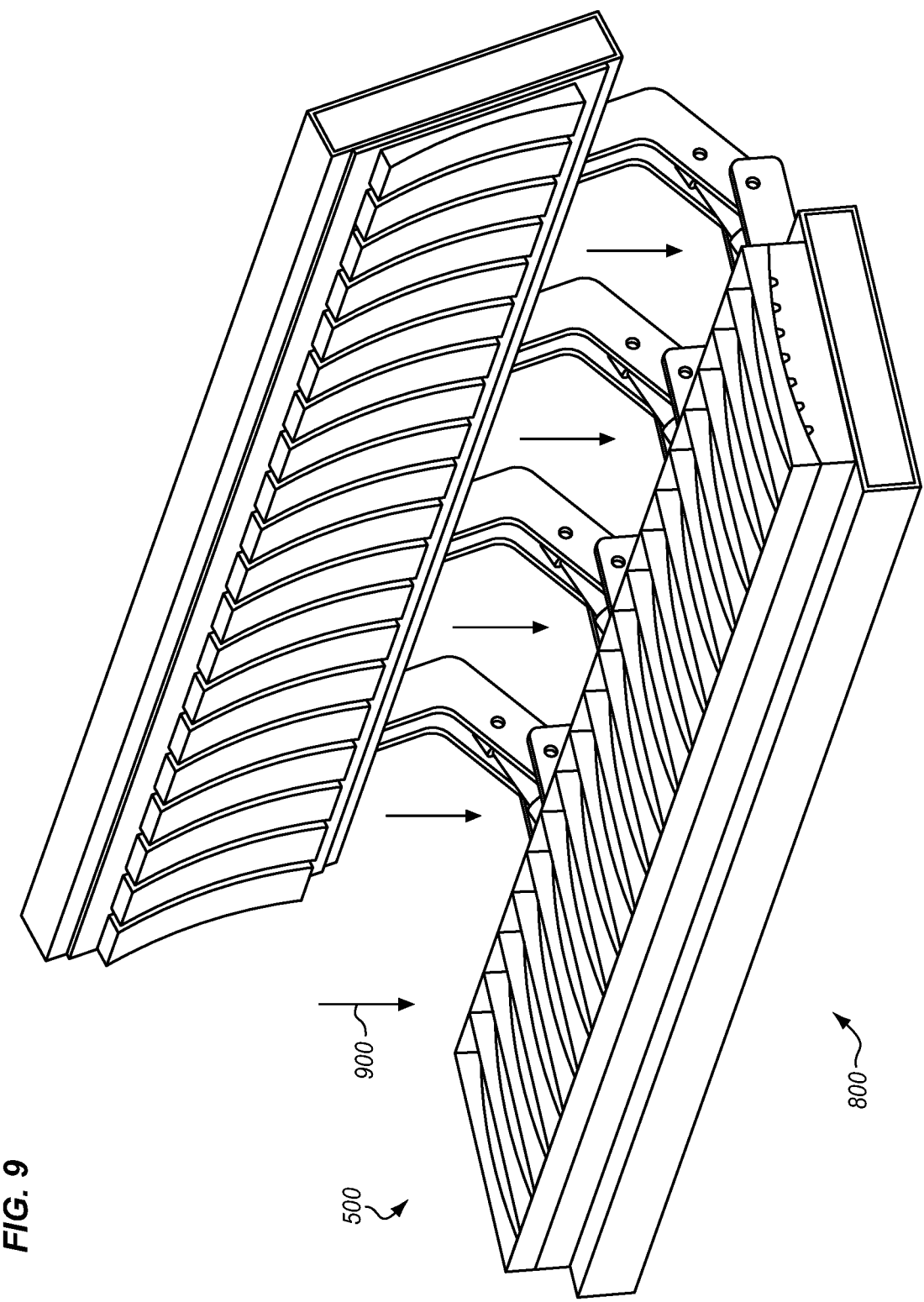
FIGS. 9-10 depict a press closing over a cartridge in an illustrative embodiment.
Figure 10:
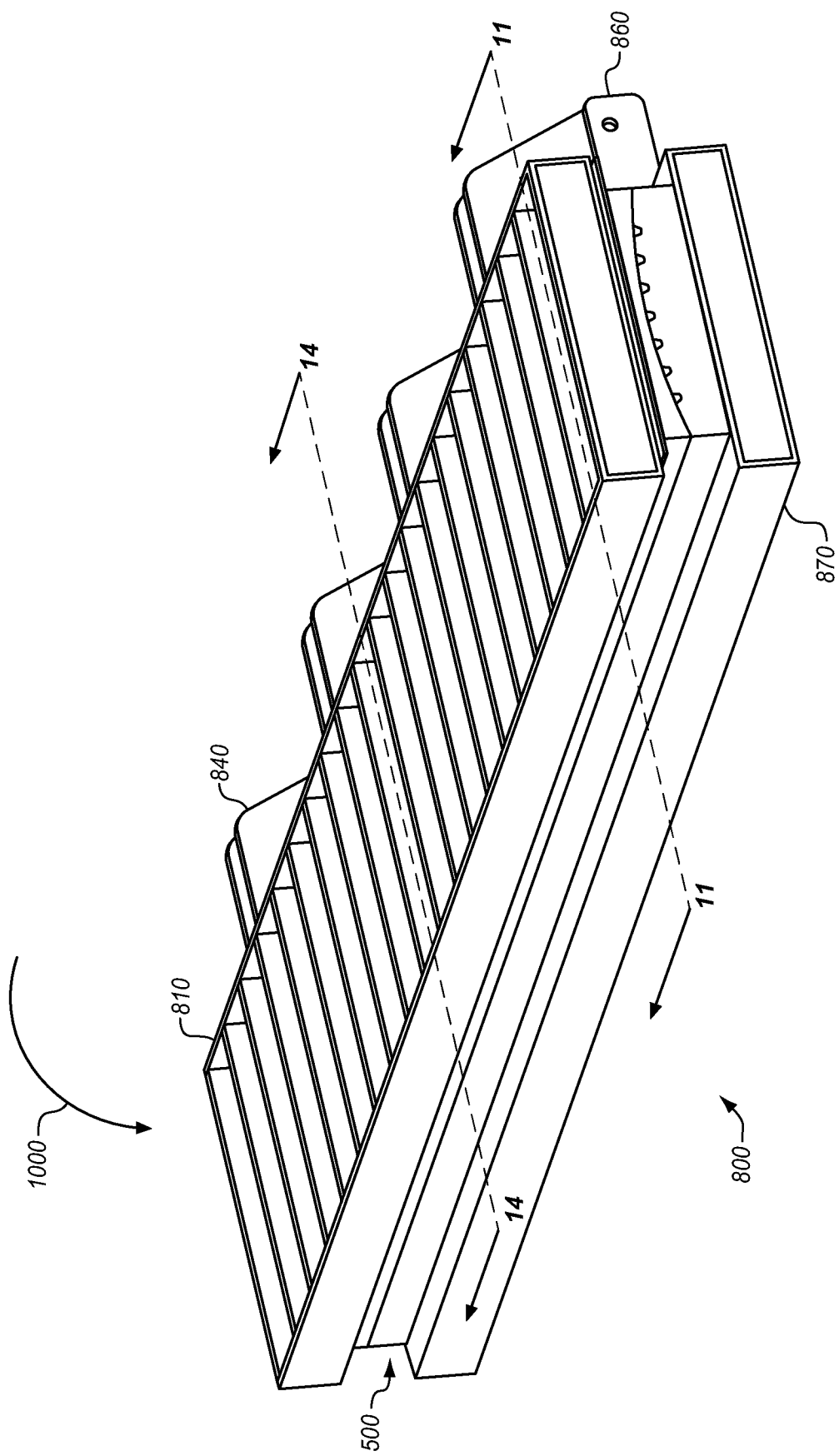

FIGS. 9-10 depict a press closing over a cartridge in an illustrative embodiment. Specifically, in FIG. 9 the cartridge 500 is lowered in direction 900 into the press 800, and in FIG. 10 the press 800 is closed by the rotation of the strong back 810 along direction 1000.

Figure 11:
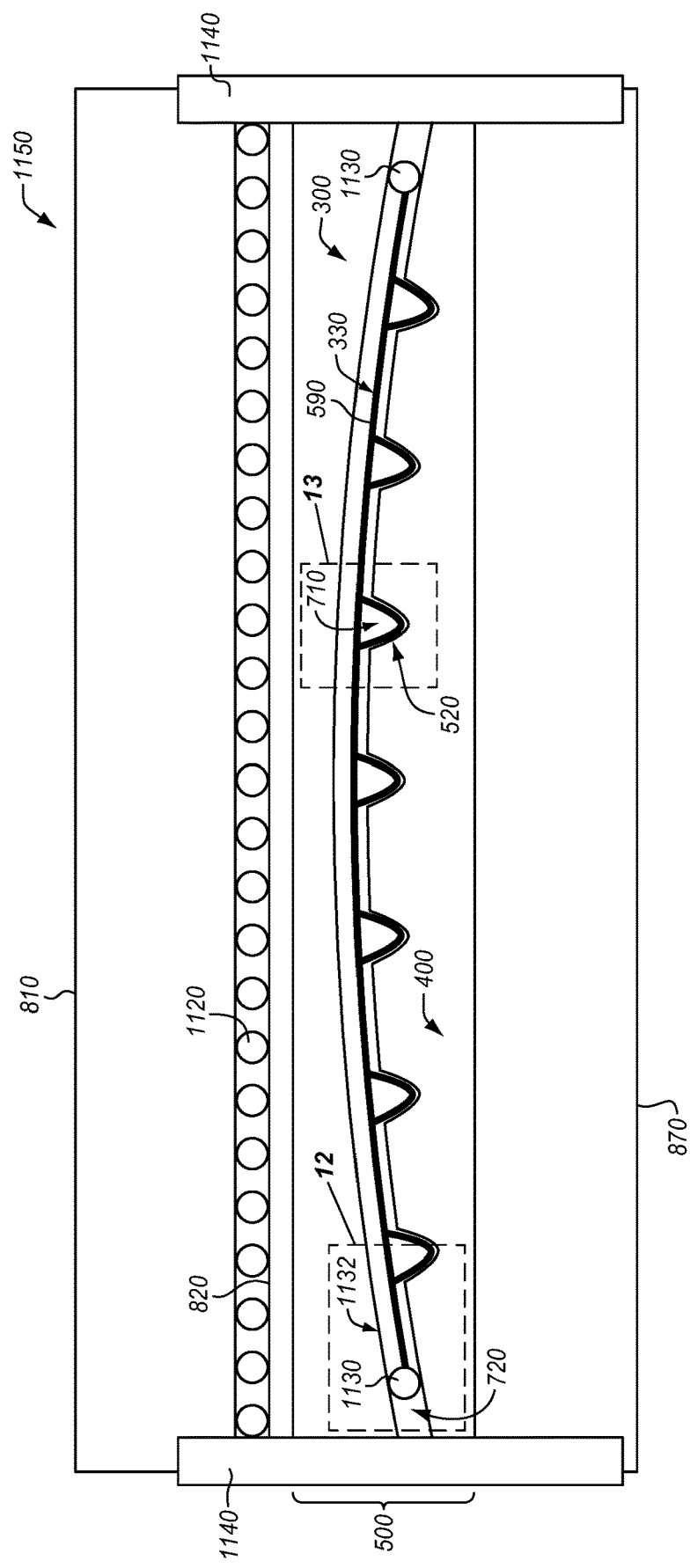
FIGS. 11-13 are section cut views of press that has closed over a cartridge in an illustrative embodiment.
Figure 12:
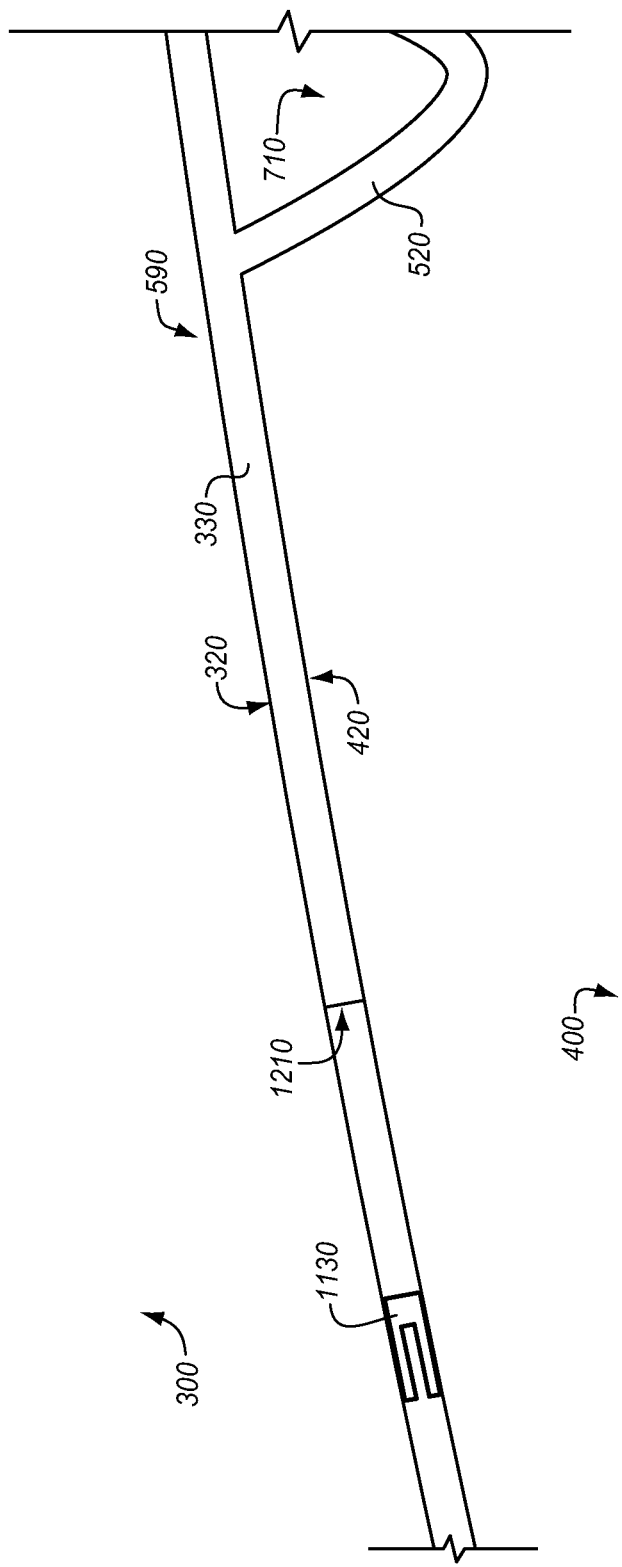
Figure 13:
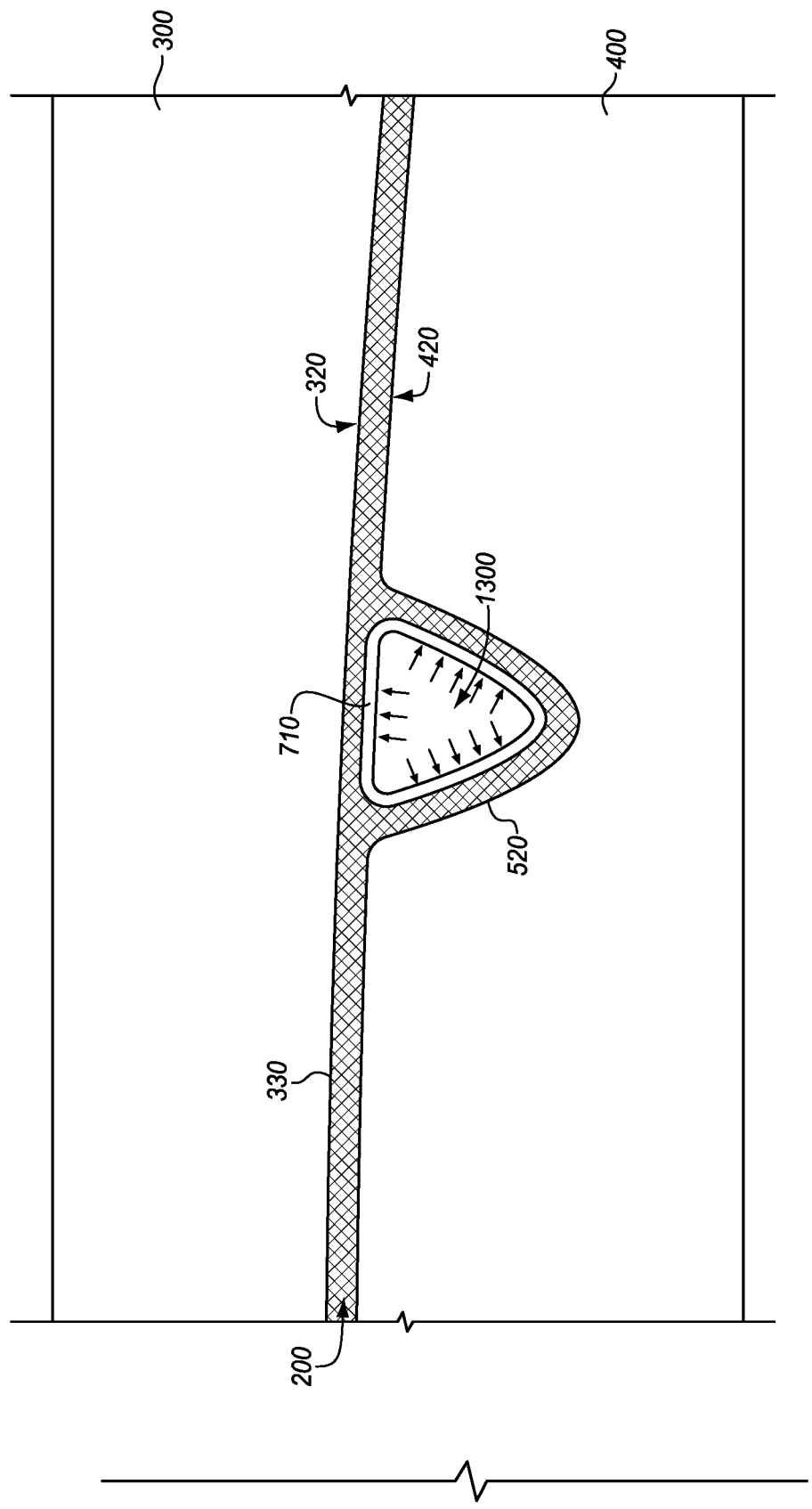

FIGS. 11-13 are section cut views of press that has closed over a cartridge in an illustrative embodiment. Specifically, FIG. 11 corresponds with view arrows 11 of FIG. 10, FIG. 12 corresponds with region 12 of FIG. 11, and FIG. 13 corresponds with region 13 of FIG. 11.

In FIG. 11, the press 800 further includes pressure hoses 1120 (e.g., fire hoses having a four-inch diameter) that are disposed between the platen 820 and the strong back 810. By inflating the pressure hoses 1120 to a desired pressure (e.g., one hundred pounds per square inch (PSI), applied via a pressure source 750 such as shop air), pressure is applied via platen 820 to the OML tool 300 and the IML, tool 400, enforcing a desired shape onto the wing panel preform 590. Seals 1130 are disposed at the interface 720 between the OML tool 300 and IML tool 400 at the periphery 132 of the wing panel preform 590, and prevent resin bleed out by sealing the space between OML tool 300 and IML tool 400. In one embodiment, each of the seals 1130 comprises a large O-ring that entirely surrounds the periphery 1132 of the wing panel preform 590. Latches 1140 are locked into place to hold strong back 810 in a locked position 1150 relative to strong back 870. In FIG. 12, a linear portion of the seal 1130 is depicted between the IML tool 400 and the OML tool 300, and is disposed beyond a boundary 1210 of the wing panel preform 590. In FIG. 13, inflation of a bladder 710 is depicted during hardening, resulting in a pressurized volume 1300 within the bladder 710 that helps to enforce a desired shape onto a stringer preform 520.

Figure 14:
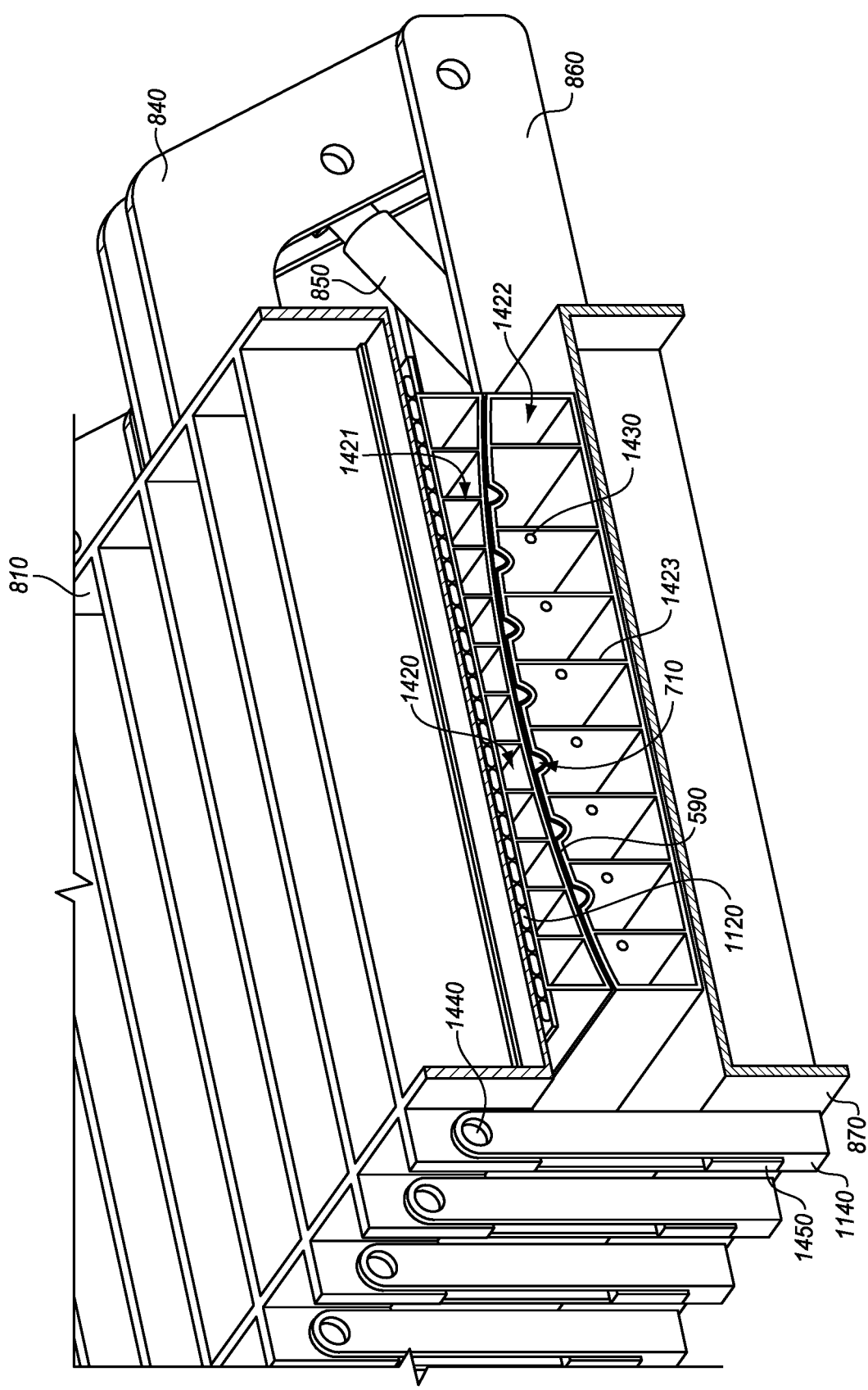
FIG. 14 is a section cut view of a press that is heated by steam in an illustrative embodiment.

FIG. 14 is a section cut view of a press 800 that is heated by steam in an illustrative embodiment. As shown in FIG. 14, the cartridge 500 includes volumes 1420 defined by ribs 1421 of OML tool 300 that are dimensioned to receive heated steam, and volumes 1422 defined by ribs 1423 of IML tool 400 for receiving steam. The volumes 1420 and the volumes 1422 are sealed within their respective tools, and include access holes 1430 for distributing steam. Thus, when steam is applied to the volumes 1420 and the volumes 1422 (e.g., at three hundred and fifty degrees Fahrenheit, at one hundred and twenty PSI), the IML tool 400 and the OML tool 300 are rapidly heated. FIG. 14 further illustrates that the latches 1140 are locked in position via rotation of latches 1140 about axis 1440, and placement of the latches 1140 onto retention elements 1450 of strong back 870.

Figure 15:
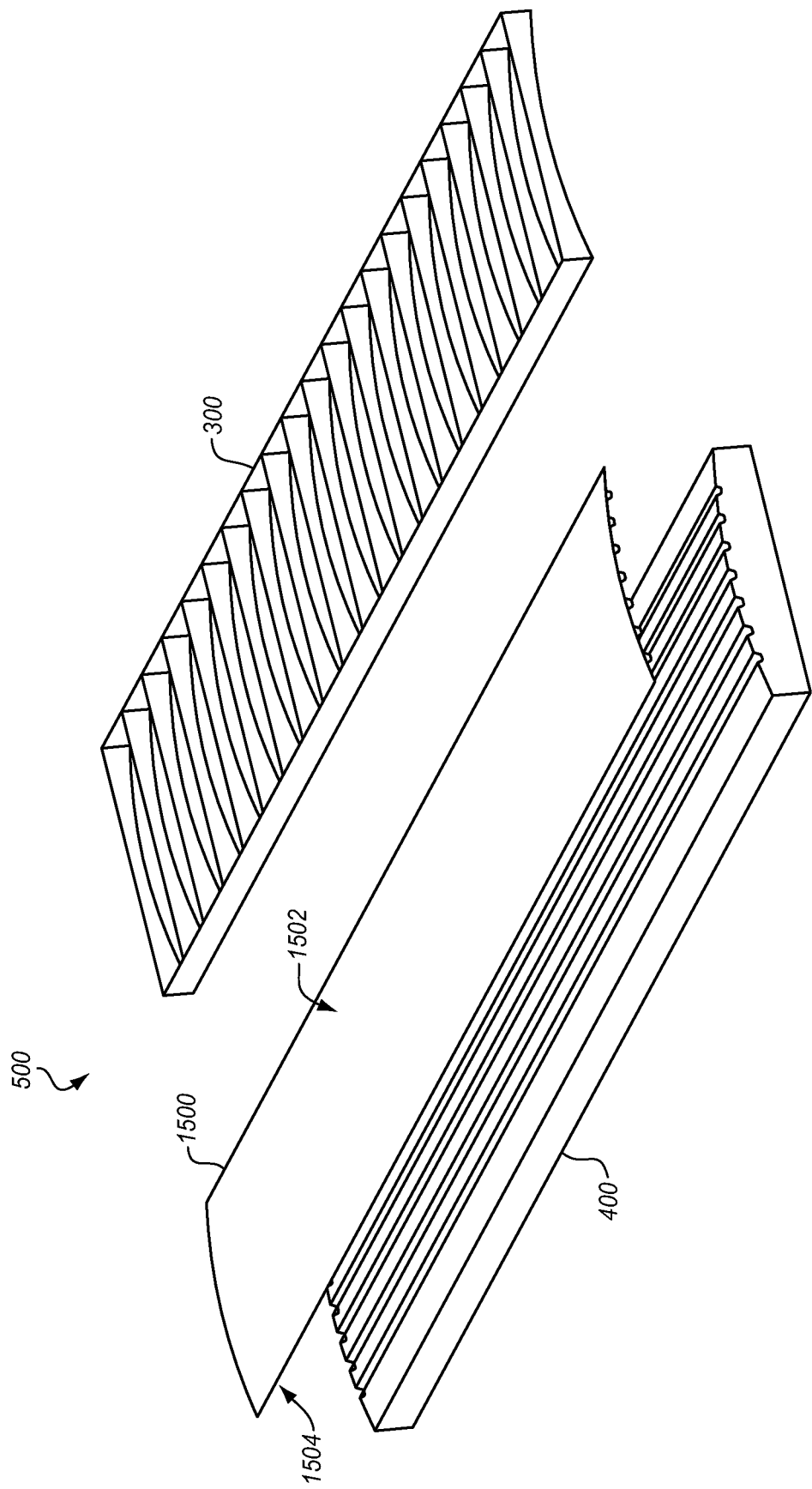
FIG. 15 depicts demolding of a composite part from a cartridge in an illustrative embodiment.

FIG. 15 depicts demolding of a composite part 1500 from a cartridge 500 in an illustrative embodiment. In this embodiment, the composite part 1500 comprises a composite part for a wing panel 200, and has an IML 1504 and an OML 1502, although in further embodiments any suitable composite part may be fabricated via the cartridge molding techniques discussed herein. The demolding process may be performed after the cartridge 500 has been removed from the press 800, which means that the press 800 may operate to heat and pressurize another cartridge while a first cartridge is being demolded.

Figure 16:
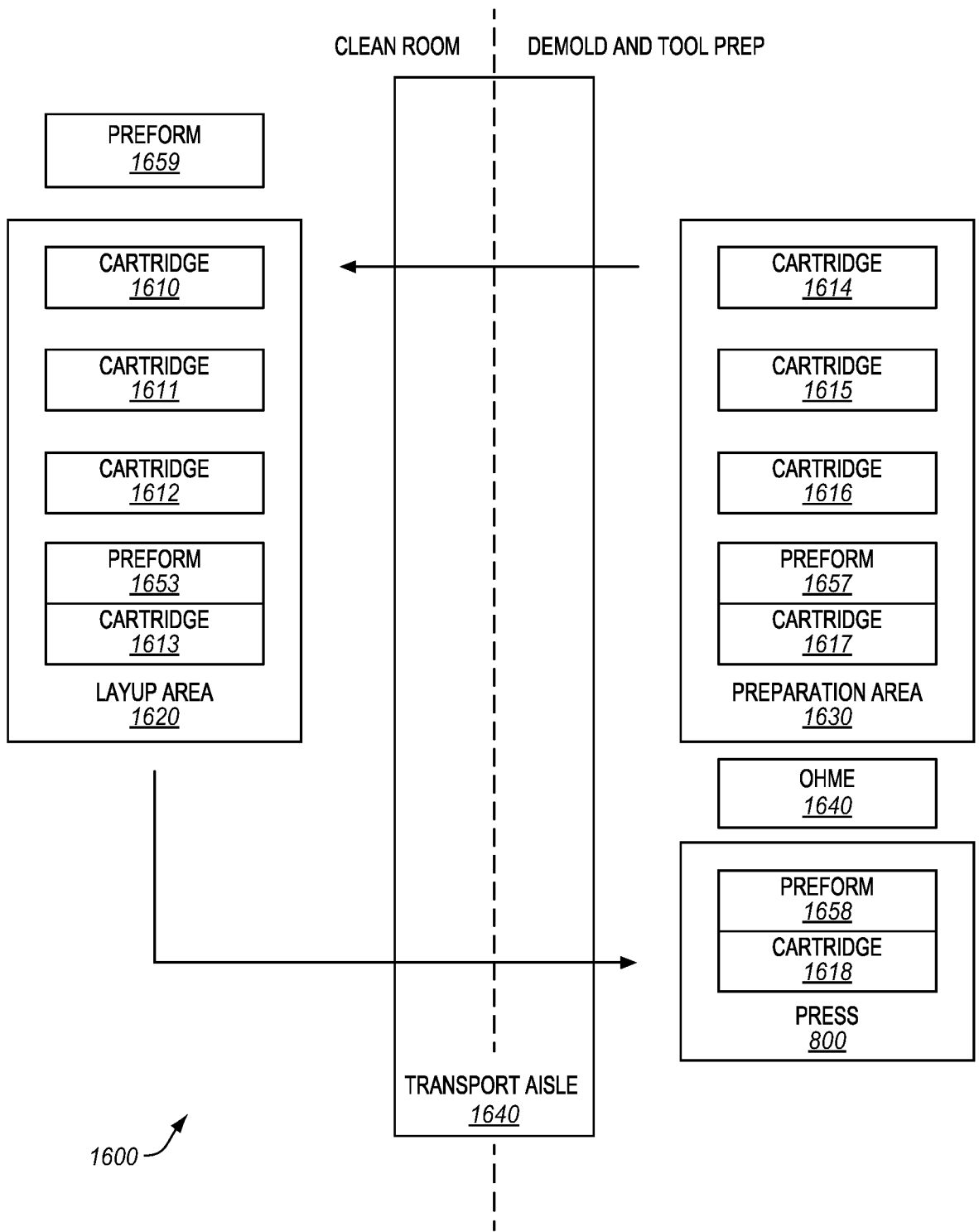
FIG. 16 depicts a factory layout for cartridge molding in an illustrative embodiment.

FIG. 16 depicts a factory layout 1600 for cartridge molding in an illustrative embodiment. As shown in FIG. 16, the factory layout 1600 includes a layup area 1620, which includes a cartridge 1610, cartridge 1611, cartridge 1612, and cartridge 1613. Cartridge 1613 includes a wing panel preform 1653 for hardening into a composite part. Cartridges are transported along a transport aisle to a preparation area 1630, which presently holds a cartridge 1614, a cartridge 1615, a cartridge 1616, and a cartridge 1617. Cartridge 1617 holds a composite part 1657 being demolded. The preparation area 1630 may be utilized for assembling a cartridge, sealing a cartridge, or performing other tasks. Cartridges are then transferred between the preparation area 1630 and a press 800 via overhead mechanical equipment (OHME) 1640. Presently, the press 800 holds a cartridge 1618 which holds a wing panel preform 1658. After demolding, a cartridge may be cleaned and returned to the layup area 1620 to receive another wing panel preform 1659. Utilizing a large number of cartridges that are removable from the press 800 ensures that the press is operated for a longer portion of the day, resulting in greater manufacturing efficiency.

Figure 17:
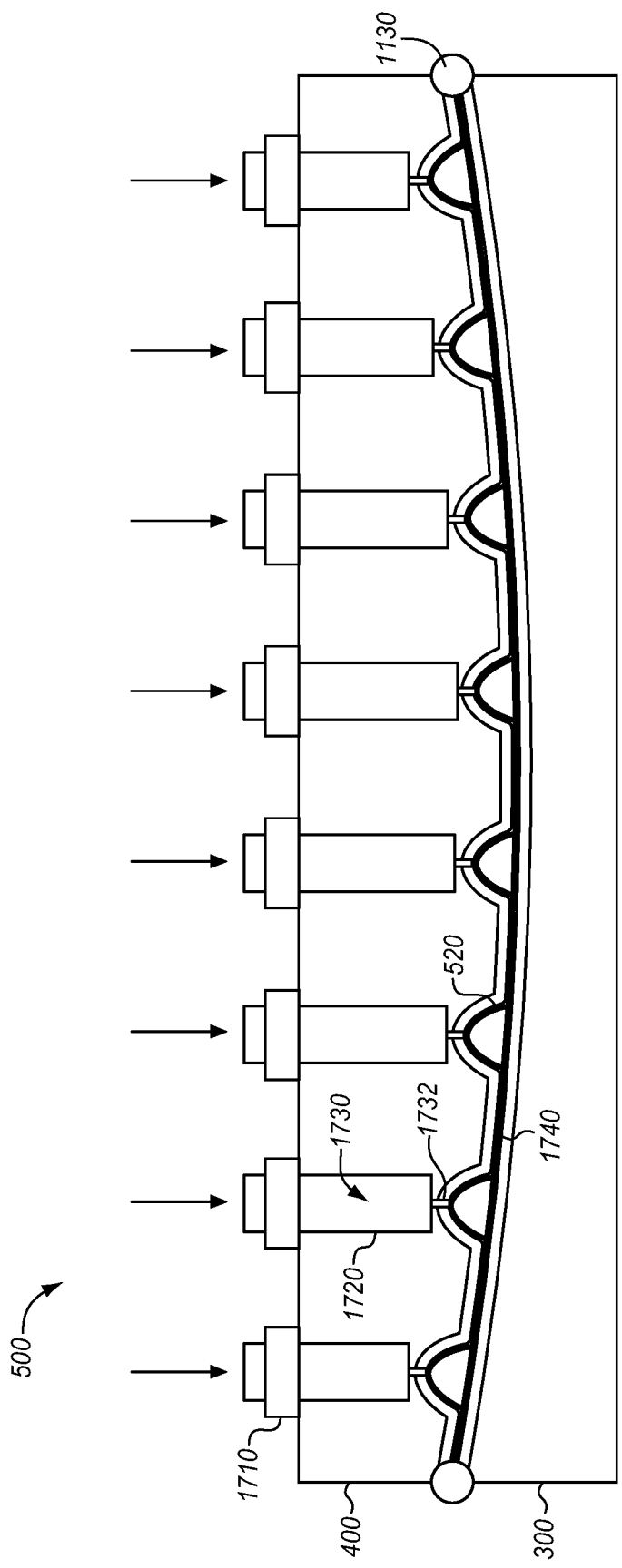
FIG. 17 depicts resin injection performed at a cartridge in an illustrative embodiment.

FIG. 17 depicts a further embodiment wherein resin injection is performed at a cartridge 500 in an illustrative embodiment. In this embodiment, the IML tool 400 includes ports 1710, which are utilized to inject resin 1730 (i.e., liquid resin) via channels 1720 and nozzles 1732 to a preform 1740 for a wing panel (e.g., a dry fiber implementation of wing panel preform 590), thereby impregnating the preform 1740 with resin. The ports 1710 may comprise quick-connect couplings to facilitate ease of use and easy attachment to resin transfer lines (not shown). By sealing the wing panel preform 590 into place at a cartridge 500 and then injecting resin in a pressurized manner via the ports 1710, preforms can be rapidly impregnated with resin in a repeatable manner.

In embodiments where preform 1740 is pre-impregnated with resin, cartridge 500 may be utilized for a quick injection of 0.5% to 2% resin to "top off" the tool in low pressure areas (e.g., via a Same Qualified Resin Transfer Molding (SQRTM) process). In embodiments where preform 1740 is made of dry fiber, a longer injection of 35%-40% (by volume) resin may be applied to soak all the fibers in the preform (e.g., via a Resin Transfer Molding (RTM) process). Regardless of embodiment, in all cases a vacuum is applied prior to any resin infusion, hence the need for air tight seals in the tooling. Any air, vapor, and/or gas present during injection will interfere with the injection process, creating voids and porosity. Hence, sealing and vacuum application are utilized prior to resin infusion to prevent this undesirable outcome.

The cartridge 500 of FIG. 17 provides a technical benefit by beneficially reducing or eliminating the need for utilizing "pre-preg" materials during layup. Furthermore, any markup at the location of nozzles 1732 may be ignored, because that markup is not located at a part interface or an aerodynamic surface. That is, any markup at a location of a nozzle 1732 is, by design, not located where the wing panel will be attached to another airframe component, nor is it located in a region that experiences airflow.

Illustrative details of the operation of cartridges 500 and press 800 will be discussed with regard to FIG. 18. Assume, for this embodiment, that a clean version of an OML tool 300 and IML tool 400 are ready to receive a layup.

Figure 18:
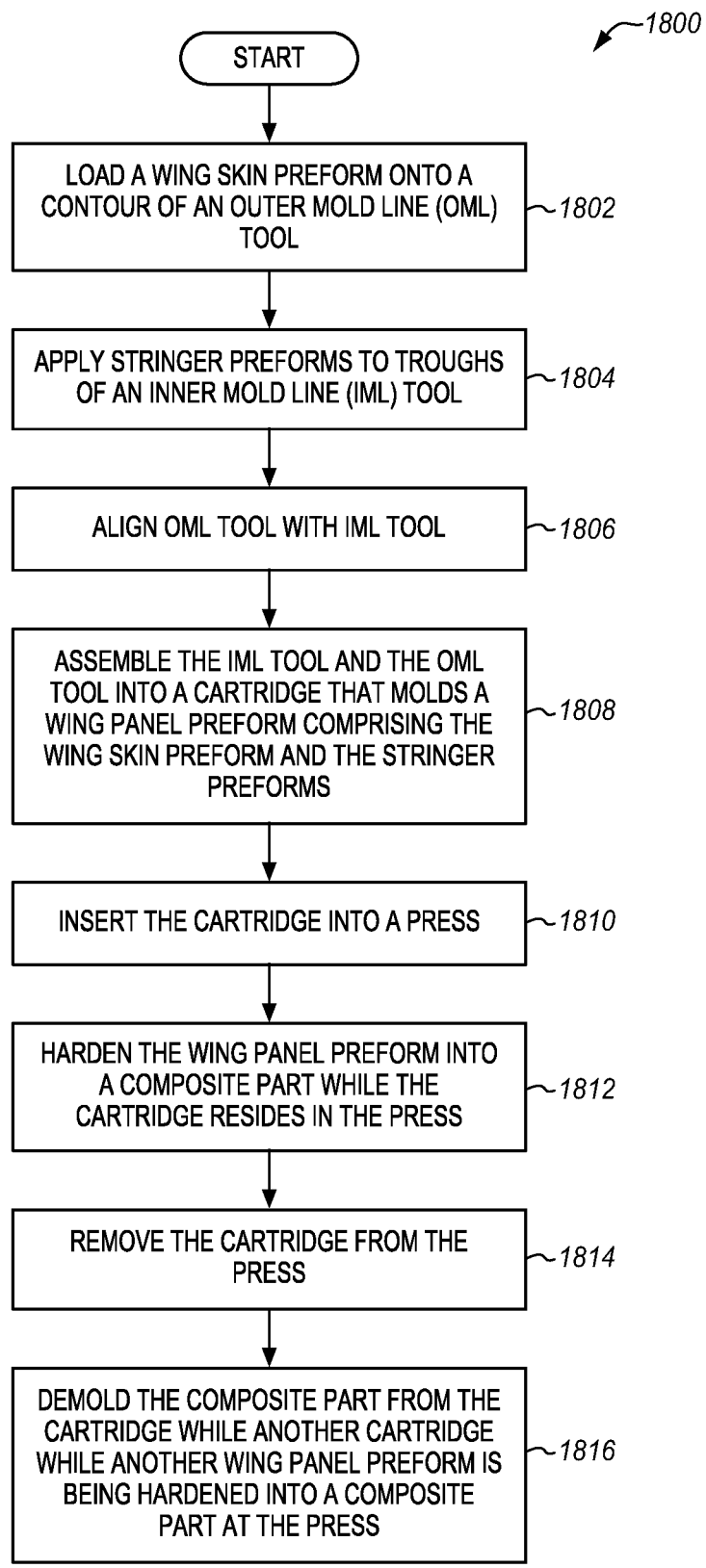
FIG. 18 is a flowchart illustrating a method for cartridge molding of wing panels in an illustrative embodiment.

FIG. 18 is a flowchart illustrating a method 1800 for cartridge molding of wing panels in an illustrative embodiment. The steps of method 1800 are described with reference to press 800 of FIG. 8, but those skilled in the art will appreciate that method 1800 may be performed in other systems. The steps of the flowcharts described herein are not all inclusive and may include other steps not shown. The steps described herein may also be performed in an alternative order.

Method 1800 includes loading 1802 (e.g., laying up, or placing) a wing skin preform 330 onto a contour 320 of an OML tool 300. This may comprise performing hand layup, layup via an Automated Tape Laying Machine (ATLM) or Advanced Fiber Placement (AFP) machine, etc. Loading 1802 may be performed within layup area 1620, within a clean room environment.

Method 1800 further comprises applying 1804 stringer preforms 520 to troughs 430 of an IML tool 400. In one embodiment, this comprises picking and placing stringer preforms 520 (including any bladders 710 therein) into the troughs 430. In a further embodiment, this comprises directly fabricating the stringer preforms 520 at the troughs 430. Applying 1804 may be performed within layup area 1620, within a clean room environment.

Method 1800 further includes aligning 1806 the OML tool 300 with the IML tool 400, for example by inverting the OML tool 300 and placing the OML tool 300 over the IML, tool 400. This may comprise operating the OHME 1640 or other heavy equipment to place the OML tool 300 in position, or to place the IML tool 400 in position. In one embodiment, aligning is facilitated via the use of complementary indexing features at the OML tool 300 and the IML tool 400.

Method 1800 further comprises assembling 1808 the IML tool 400 and the OML tool 300 into a cartridge 500 that molds a wing panel preform 590 comprising the wing skin preform 330 and the stringer preforms 520. In one embodiment, this comprises lowering the IML tool 400 onto the OML tool 300 while aligned, or vice versa. This step may further comprise applying one or more end plates 600 to seal off ends 510 of the cartridge 500. Assembling 1808 may be performed within preparation area 1630. That is, assembling 1808 may be followed by sealing the IML tool 400 to the OML tool 300 at the cartridge 500 by applying an end plate 600 to an end 510 of the cartridge 500. Sealing provides a technical benefit by preventing resin bleed out. In a further embodiment, after assembly of the cartridge 500, the method 1800 further includes injecting the resin 1730 into the wing panel preform 590 via ports 1710 at the IML tool 400, prior to hardening the wing panel preform 590.

Method 1800 further includes inserting 1810 the cartridge 500 into a press 800. In one embodiment, this comprises operating the OHME 1640 to position the cartridge 500 over the press 800, followed by lowering the cartridge 500 into place. In further embodiments, this comprises aligning the volumes 550 and volumes 570 with heaters 830 and heaters 880 at the press 800. In still further embodiments, this comprises attaching a steam reservoir (e.g., steam reservoir 2010 of FIG. 20) to the cartridge 500 via pressure tubing 1020, and/or attaching a pressure source 750 to ports 610 at the cartridge 500.

Method 1800 further includes hardening 1812 the wing panel preform 590 into a composite part 1500 while the cartridge 500 resides in the press 800. This comprises applying heat and pressure at the press 800 (e.g., one hundred PSI at three hundred and fifty degrees Fahrenheit) for an extended period in order to cure a thermoset resin or consolidate a thermoplastic resin within the wing panel preform 590. In one embodiment, hardening the wing panel preform 590 comprises activating the heaters 830 and 880 of the press 800 that nest within the cartridge 500 while the cartridge 500 is inserted into the press 800. Utilizing heaters 830 and 880 in the press 800 provides a technical benefit because it increases the efficiency and ease of heating the wing panel preform 590 after the cartridge 500 has been inserted. In a further embodiment, hardening the wing panel preform 590 comprises driving steam through the IML, tool 400 and OML tool 300 while the cartridge 500 is inserted into the press 800. Driving steam provides a technical benefit by massively increasing the speed of heating and cooling at the cartridge 500. During the hardening, bladders 710 within the stringer preforms 520 are inflated. The inflation of the bladders 710 provides a technical benefit by ensuring that the stringer preforms 520 remain in a desired shape while being hardened.

Method 1800 further includes removing 1814 the cartridge 500 from the press 800, and may be performed via OHME 1640. Thus, in one embodiment, OHME 1640 removes the cartridge 500 from the press 800. A cartridge 500 that has been removed may be transported to preparation area 1630 for demolding. Removing 1814 may be followed by demolding 1816 the composite part 1500 from the cartridge 500 while another cartridge 500 for another wing panel preform 590 is being hardened into a composite part 1500 at the press 800. The cartridge 500 may proceed to cleaning and return to a layup area 1620. Thus, the method 1800 may further comprise loading 1802 (e.g. laying up) another wing skin preform 330 onto the contour 320 of the OML tool 300 after demolding. This provides a technical benefit by increasing the re-usability of tooling for wing panel preforms 590.

The steps of loading, demolding, and hardening may be performed concurrently for different cartridges, such that a cartridge 1610 receives layup while a cartridge 1614 undergoes demolding while a cartridge 1618 is hardened in the press 800.

Figure 19:
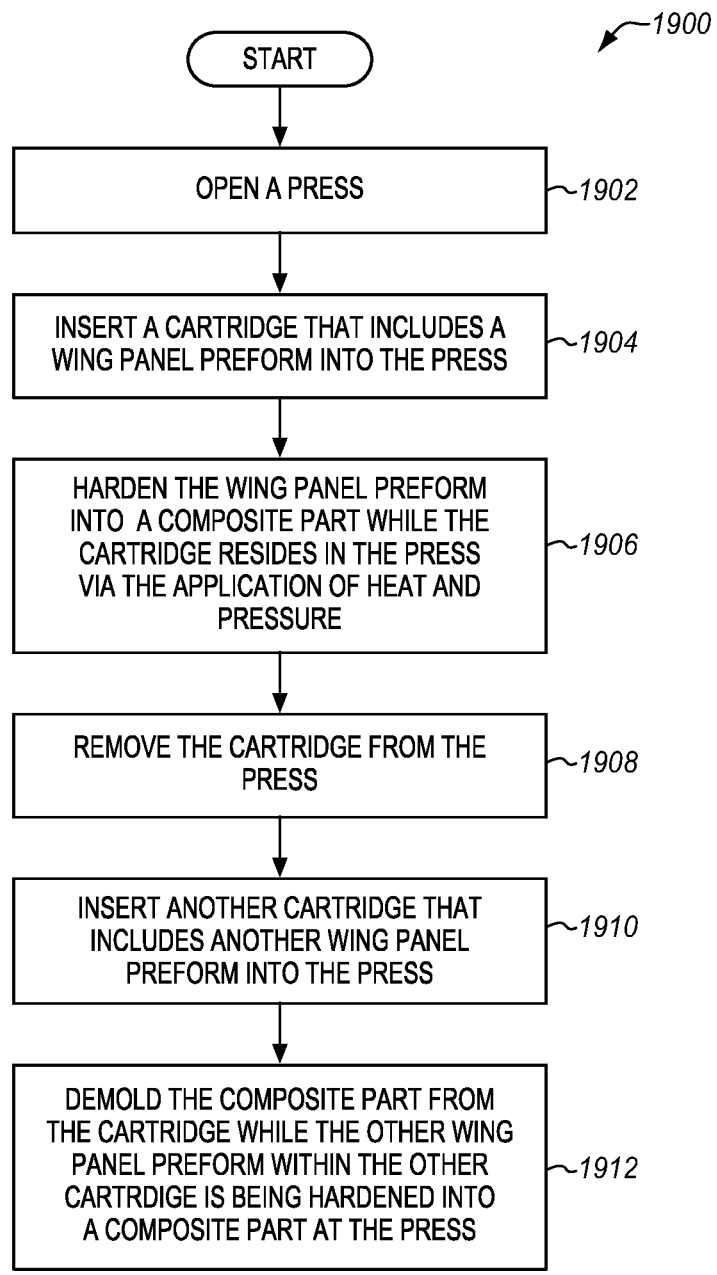
FIG. 19 is a flowchart illustrating a further method for cartridge molding of wing panels in an illustrative embodiment.

FIG. 19 is a flowchart illustrating a further method 1900 for cartridge molding of wing panels 200 in an illustrative embodiment. Method 1900 includes opening 1902 a press 800 (e.g., via the action of hydraulic piston 850), and inserting 1904 a cartridge 500 that includes a wing panel preform 590 into the press 800. The inserting 1904 may be performed via the operation of OHME 1640.

Method 1900 further includes hardening 1906 the wing panel preform 590 into a composite part 1500 while the cartridge 500 resides in the press 800 via the application of heat and pressure, and removing 1908 the cartridge 500 from the press 800. In one embodiment, the heat and pressure is applied via heaters 830 and/or heaters 880 at the press 800. In a further embodiment, the heat and pressure is applied via fluid 2012 of FIG. 20 below. In one embodiment, heat is continuously applied to the press 800 and the press 800 remains heated as it is used to harden multiple wing panel preforms 590 in a series of cartridges 500. For example, heaters 830 may remain activated, or may be controlled to maintain the press 800 at a hardening temperature for resin in the cartridges 500, even as cartridges 500 are swapped out and replaced with others. In a further embodiment, the press 800 is heated and then cooled for each cartridge 500 to facilitate loading and unloading processes for the cartridges 500.

Method 1900 further includes inserting 1910 another cartridge 1610 that includes another wing panel preform 1653 into the press 800, and demolding 1912 the composite part 1500 from the cartridge 500 while the other wing panel preform 1653 within the other cartridge 1610 is being hardened into a composite part 1500 at the press 800. Method 1900 provides a technical benefit by enhancing throughput for wing panel fabrication, because it increases the rate at which hardening may be performed for wing panel preforms 590.

In a further embodiment, each cartridge 500 includes an OML tool 300 and an IML, tool 400, and the method further includes separating the OML tool (300) from the IML, tool 400 after the hardening 1906.

Figure 20:
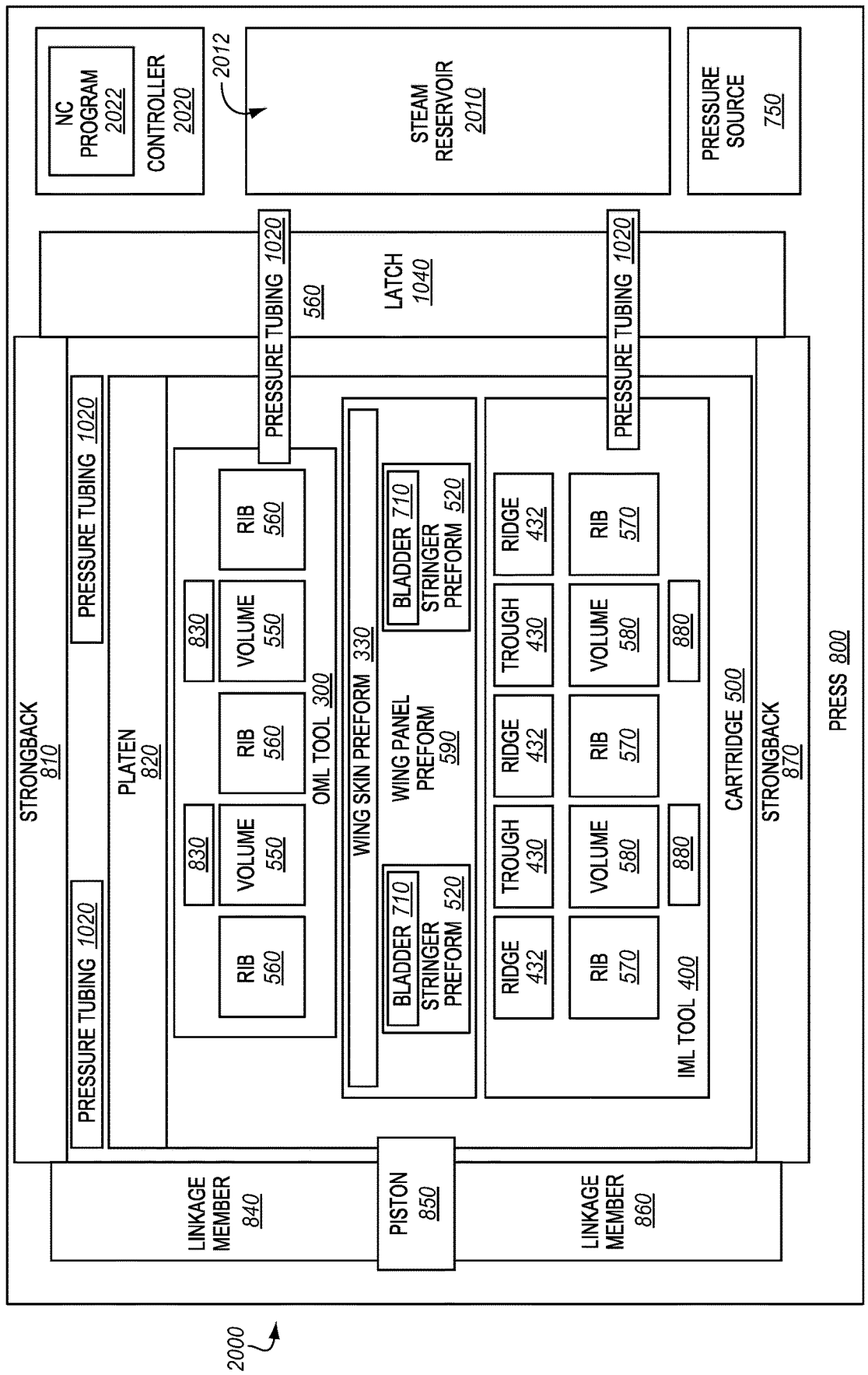
FIG. 20 is a block diagram of a cartridge molding system in an illustrative embodiment.

FIG. 20 is a block diagram of a cartridge molding system 2000 in an illustrative embodiment. In this embodiment, the cartridge molding system 2000 includes a press 800, comprising a strong back 810, platen 820, heaters 830, linkage member 840, hydraulic piston 850, linkage member 860, strong back 870, and heater 880. A latch 1040 holds the strong backs 810 and 870 together. Pressure tubing 1020 applies pressure via the platen 820 when the pressure tubing 1020 is inflated.

A cartridge 500 is held within the press 800. The cartridge 500 includes OML tool 300 having volumes 550 and ribs 560, as well as IML tool 400 having ridges 432 defined by troughs 430, as well as ribs 580 and volumes 570. A wing panel preform 590 is disposed between the IML tool 400 and the OML tool 300, and includes a wing skin preform 330, as well as stringer preforms 520.

Bladders 710 are disposed within the stringer preforms 520. The bladders 710 are inflated via pressure tubing 1020 which is coupled with a pressure source 750 via pressure tubing 1020, which is omitted for the sake of clarity. The volumes 550 and volumes 570 of the cartridge 500 are filled with steam 2012 via steam reservoir 2010.

Controller 2020 manages the various operations of the components discussed herein, for example by regulating pressure and temperature applied to the wing panel preform 590, directing opening and closing of the press 800, or controlling OHME 1640 in accordance with a Numerical Control (NC) program 2022. In one embodiment, controller 2020 is implemented as custom circuitry, as a hardware processor executing programmed instructions stored in memory, or some combination thereof.

EXAMPLES

In the following examples, additional processes, systems, and methods are described in the context of a fabrication system for aircraft.

Figure 21:
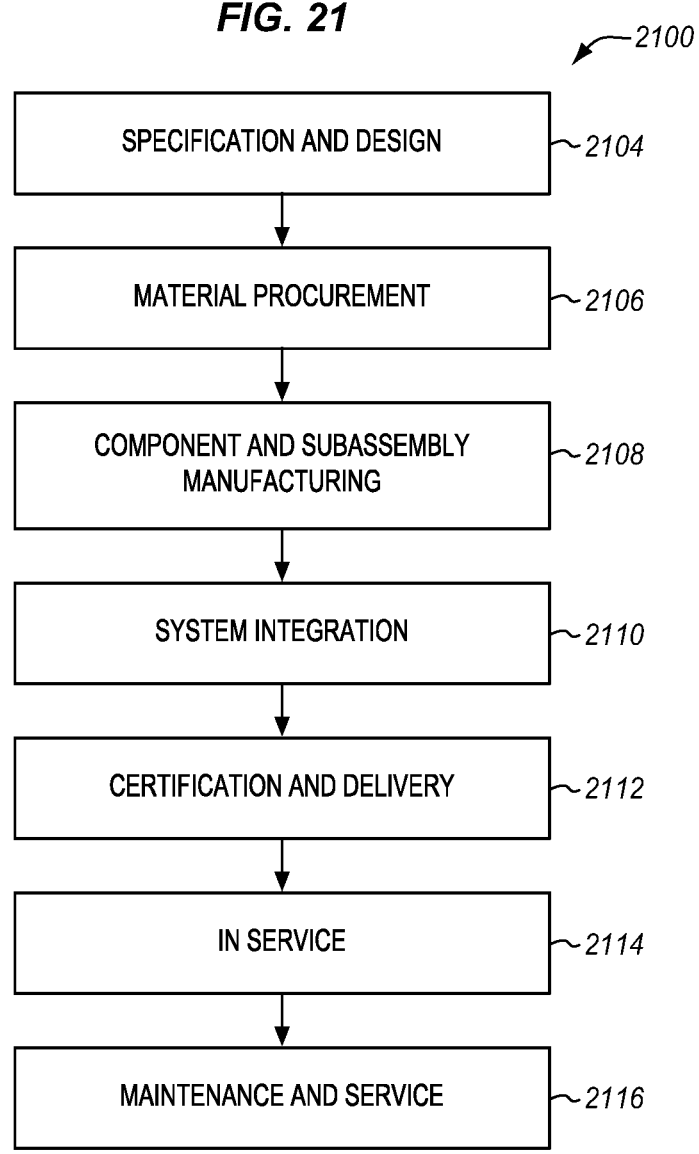
FIG. 21 is a flow diagram of aircraft production and service methodology in an illustrative embodiment.
Figure 22:
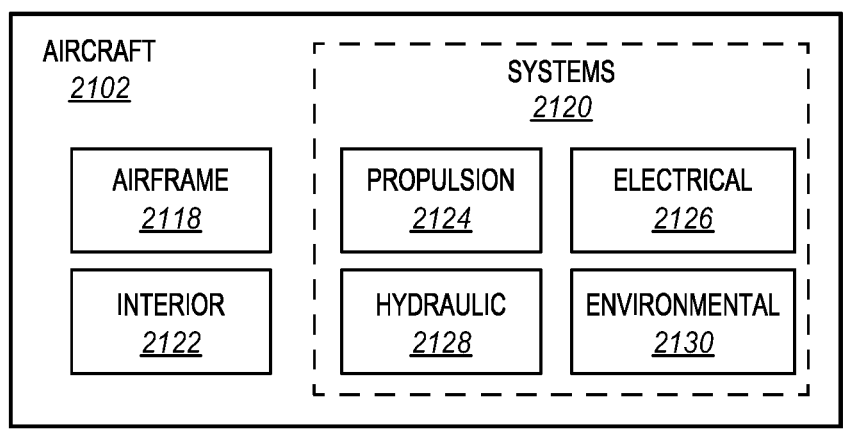
FIG. 22 is a block diagram of an aircraft in an illustrative embodiment.

Referring more particularly to the drawings, embodiments of the disclosure may be described in the context of aircraft manufacturing and service in method 2100 as shown in FIG. 21 and an aircraft 2102 as shown in FIG. 22. During pre-production, method 2100 may include specification and design 2104 of the aircraft 2102 and material procurement 2106. During production, component and subassembly manufacturing 2108 and system integration 2110 of the aircraft 2102 takes place. Thereafter, the aircraft 2102 may go through certification and delivery 2112 in order to be placed in service 2114. While in service by a customer, the aircraft 2102 is scheduled for routine work in maintenance and service 2116 (which may also include modification, reconfiguration, refurbishment, and so on). Apparatus and methods embodied herein may be employed during any one or more suitable stages of the production and service described in method 2100 (e.g., specification and design 2104, material procurement 2106, component and subassembly manufacturing 2108, system integration 2110, certification and delivery 2112, service 2114, maintenance and service 2116) and/or any suitable component of aircraft 2102 (e.g., airframe 2118, systems 2120, interior 2122, propulsion system 2124, electrical system 2126, hydraulic system 2128, environmental 2130).

Each of the processes of method 2100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 2102 produced by method 2100 may include an airframe 2118 with a plurality of systems 2120 and an interior 2122. Examples of systems 2120 include one or more of a propulsion system 2124, an electrical system 2126, a hydraulic system 2128, and an environmental system 2130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 2100. For example, components or subassemblies corresponding to component and subassembly manufacturing 2108 may be fabricated or manufactured in a manner similar to components or subassemblies produced while the aircraft 2102 is in service. Also, one or more apparatus embodiments, method embodiments, or a combination thereof may be utilized during the subassembly manufacturing 2108 and system integration 2110, for example, by substantially expediting assembly of or reducing the cost of an aircraft 2102. Similarly, one or more of apparatus embodiments, method embodiments, or a combination thereof may be utilized while the aircraft 2102 is in service, for example and without limitation during the maintenance and service 2116. Thus, the invention may be used in any stages discussed herein, or any combination thereof, such as specification and design 2104, material procurement 2106, component and subassembly manufacturing 2108, system integration 2110, certification and delivery 2112, service 2114, maintenance and service 2116 and/or any suitable component of aircraft 2102 (e.g., airframe 2118, systems 2120, interior 2122, propulsion system 2124, electrical system 2126, hydraulic system 2128, and/or environmental 2130).

In one embodiment, a part comprises a portion of airframe 2118, and is manufactured during component and subassembly manufacturing 2108. The part may then be assembled into an aircraft in system integration 2110, and then be utilized in service 2114 until wear renders the part unusable. Then, in maintenance and service 2116, the part may be discarded and replaced with a newly manufactured part. Inventive components and methods may be utilized throughout component and subassembly manufacturing 2108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a wing panel for an aircraft, the method comprising:
loading a wing skin preform onto a contour of an Outer Mold Line (OML) tool;
applying stringer preforms to troughs of a surface of an Inner Mold Line (IML) tool;
aligning the OML tool with the IML, tool;
assembling the IML tool and the OML tool into a cartridge that molds a wing panel preform comprising the wing skin preform and the stringer preforms;
inserting the cartridge into a press; and
hardening the wing panel preform into a composite part while the cartridge resides in the press by activating heaters of the press that nest within the cartridge while the cartridge is inserted into the press.

2. The method of claim 1 further comprising:
removing the cartridge from the press; and
demolding the composite part from the cartridge while another wing panel preform within another cartridge is being hardened into a composite part at the press.

3. The method of claim 2 further comprising:
loading another wing skin preform onto the contour of the OML tool after demolding.

4. The method of claim 1 wherein:
the wing skin preform and the stringer preforms comprise prepregs.

5. The method of claim 1 further comprising:
separating the OML tool from the IML tool after hardening the wing panel preform.

6. The method of claim 1 further comprising:
inflating bladders within the stringer preforms while hardening the wing panel preform.

7. The method of claim 1, further comprising:
sealing the IML tool to the OML tool by applying an end plate to an end of the cartridge.

8. The method of claim 1 further comprising:
injecting resin into the wing panel preform via ports at the IML tool, prior to hardening the wing panel preform.

9. A method for hardening wing panels, the method comprising:
assembling a cartridge by:
loading a wing skin preform onto a contour of an Outer Mold Line (OML) tool;
applying stringer preforms to troughs of a surface of an Inner Mold Line (IML) tool;
aligning the OML tool with the IML, tool; and
assembling the IML tool and the OML tool that molds a wing panel preform comprising the wing skin preform and the stringer preforms;
opening a press;
inserting the cartridge into the press;
hardening the wing panel preform into a composite part while the cartridge resides in the press via the application of heat and pressure by activating heaters of the press that nest within the cartridge while the cartridge is inserted into the press;
removing the cartridge from the press;
assembling another cartridge;
inserting the other cartridge into the press; and
demolding the composite part from the cartridge while the other cartridge is inserted into the press.

10. The method of claim 9 wherein:
the demolding comprises separating the OML tool from the IML tool after the hardening.

11. The method of claim 9 further comprising:
inflating bladders within the stringer preforms while hardening the wing panel preform.

12. The method of claim 9, further comprising sealing the IML tool to the OML tool.

13. A method for fabricating a wing panel for an aircraft, the method comprising:
laying up a wing skin preform onto a contour of an Outer Mold Line (OML) tool;
applying stringer preforms in troughs of a surface of an Inner Mold Line (IML) tool;
aligning the OML tool with the IML, tool;
assembling the IML tool and the OML tool into a cartridge that molds a wing panel preform comprising the wing skin preform and the stringer preforms;
inserting the cartridge into a press, wherein the inserting comprises aligning volumes of at least one of the OML tool and the IML tool with heaters of the press;
applying pressure to the OML tool and the IML tool; and
hardening the wing panel preform into a composite part while the cartridge resides in the press by activating the heaters that nest within the volumes.

14. The method of claim 13 further comprising:
removing the cartridge from the press; and
demolding the composite part from the cartridge while another wing panel preform within another cartridge is being hardened into a composite part at the press.

15. The method of claim 14 further comprising:
loading another wing skin preform onto the contour of the OML tool after demolding.

16. The method of claim 13 wherein:
the wing skin preform and the stringer preforms comprise prepregs.

17. The method of claim 13 wherein the laying up and the applying comprises:
laying up the wing skin preform and placing the stringer preforms within a clean room environment.

18. The method of claim 13 further comprising:
inflating bladders within the stringer preforms while hardening the wing panel preform.

19. The method of claim 13 further comprising:
sealing the IML tool to the OML tool after assembling the IML tool and the OML tool into the cartridge.

20. The method of claim 13 further comprising:
injecting resin into the wing panel preform via ports at the IML tool, prior to hardening the wing panel preform.

* * * * *